United States Patent [19]

Rohrer

[11] Patent Number: 4,560,388
[45] Date of Patent: Dec. 24, 1985

[54] PROCESS FOR DYEING SILK OR FIBRE BLENDS CONTAINING SILK

[75] Inventor: Rudolf Rohrer, Riehen, Switzerland

[73] Assignee: Ciba-Geigy Corporation, Ardsley, N.Y.

[21] Appl. No.: 598,951

[22] Filed: Apr. 11, 1984

[30] Foreign Application Priority Data

Apr. 20, 1983 [CH] Switzerland ............... 2124/83

[51] Int. Cl.$^4$ ............... D06P 3/10; C09B 62/00
[52] U.S. Cl. ............................. 8/543; 8/549; 8/917
[58] Field of Search ........................... 8/543, 549

[56] References Cited

U.S. PATENT DOCUMENTS

| | | | |
|---|---|---|---|
| 2,950,165 | 8/1966 | Hadfield et al. | 8/543 |
| 3,178,254 | 4/1965 | Hoelzle et al. | 8/547 |
| 3,975,151 | 8/1976 | Berg et al. | 8/482 |

FOREIGN PATENT DOCUMENTS

43331  1/1982  European Pat. Off. .

OTHER PUBLICATIONS

Chemical Abstracts, vol. 92, (1980), p. 75, 77966b.
E. R. Trotman, Dyeing and Chemical Technology of Textile Fibres, Charles Griffin Comp. Ltd., London (1975), pp. 555–556.
Xia Yushu, Journal of the Society of Dyers and Colourists, vol. 99 (2), (1983), pp. 56–59.

Primary Examiner—A. Lionel Clingman
Attorney, Agent, or Firm—Wenderoth, Lind & Ponack

[57] ABSTRACT

A process for dyeing or printing silk or silk-containing fibre blends with reactive dyes, which comprises the use of a reactive dye of the formula

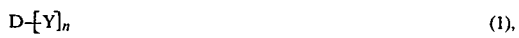

wherein D is the radical of a sulfo group containing dye of the mono- or polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide series, $[Y]_n$, where n is 1 to 4, denotes identical or different reactive radicals Y, except reactive dyes of the formula (1), wherein n is 1 and Y is a chloroacetyl, α-bromoacryloyl, α,β-dibromopropionyl, aminochloro-s-triazinyl, $C_1$–$C_4$alkoxychloro-s-triazinyl or $C_1$–$C_4$alkoxy-$C_1$–$C_4$alkoxychloro-s-triazinyl radical, and $[Y]_2$ denotes two identical chloroacetyl, α-bromoacryloyl or α,β-dibromopropionyl radicals, in aqueous medium at a temperature in the range from 50° to 130° C., and subsequently effecting dye fixation at pH 8 to 11. Dyeings or prints with good fastness properties are obtained.

19 Claims, No Drawings

PROCESS FOR DYEING SILK OR FIBRE BLENDS CONTAINING SILK

The present invention relates to the use of reactive dyes for dyeing or printing silk or fibre blends containing silk.

Depending on the requirements, textiles made of silk or blends of pure silk and wool can be dyed with dyes belonging to a variety of classes. In actual practice, acid and metal complex dyes which are also suitable for dyeing wool are principally used. The increased demands made in recent times with respect to wetfastness properties have also led to the use of reactive dyes. However, the dyeing methods proposed in the literature up to now frequently yield unsatisfactory results. Thus only low degrees of fixation are achieved in some recommended dyeing methods.

It is the object of the present invention to provide a novel improved process for dyeing or printing silk or silk-containing fibre blends with reactive dyes, with which process fast dyeings and prints are obtained. This object is accomplished with the process of the present invention, which satisfies the desired requirements.

The process of this invention comprises the use of reactive dyes of the formula

$$D-[Y]_n \quad (1),$$

wherein D is the radical of a sulfo group containing dye of the mono- or polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide series, $[Y]_n$, where n is 1 to 4, denotes identical or different reactive radicals Y, except reactive dyes of the formula (1), wherein n is 1 and Y is a chloroacetyl, α-bromoacryloyl, α,β-dibromopropionyl, aminochloro-s-triazinyl, $C_1$–$C_4$alkoxychloro-s-triazinyl or $C_1$–$_4$alkoxy-$C_1$–$C_4$alkoxychloro-s-triazinyl radical, and $[Y]_2$ denotes two identical chloroacetyl, α-bromoacryloyl or α,β-dibromopropionyl radicals, in aqueous medium at a temperature in the range from 50° to 130° C., and subsequently effecting dye fixation at pH 8 to 11.

In the process of this invention it is preferred to use:
(a) reactive dyes of the formula (1), wherein D is the radical of a mono- or disazo dye;
(b) reactive dyes of the formula (1), wherein D is the radical of a heavy metal azo complex dye;
(c) reactive dyes of the formula (1), wherein D is the radical of an anthraquinone dye;
(d) reactive dyes of the formula (1), wherein D is the radical of a copper or nickel phthalocyanine, of a copper-formazan complex or of a triphendioxazine;
(e) reactive dyes of the formula (1), wherein D is the radical of a 1:2 chromium or 1:2 cobalt complex azo dye of the benzene or naphthalene series, the chromium or cobalt atom being attached in each case to a metallisable group in the ortho-position to the azo bond;
(f) reactive dyes of the formula

$$[D_1-N=N-K]Q-Y]_n \quad (2),$$

wherein $D_1$ is the radical of a diazo component of the benzene or naphthalene series, K is the radical of a coupling component of the benzene, naphthalene or heterocyclic series, Q is a direct bond or a bridge member —N(R)—, in which R is hydrogen or unsubstituted or substituted $C_1$–$C_4$alkyl, Y is as defined for formula (1) and the reactive radical Y is attached through Q to the diazo component or to the coupling component, or both the diazo component and the coupling component each carry one or two reactive radicals, or two reactive radicals are attached to the diazo component or to the coupling component one reactive radical is attached to the coupling component or to the diazo component, and n is as defined for formula (1);
(g) reactive dyes of the formula (2), wherein R is hydrogen or methyl;
(h) reactive dyes of the formula (1) or (2), wherein n is 1, 2 or 3, preferably 1 or 2.

The radical D in formula (1) can be substituted in the usual manner and preferably contains one or more sulfonic acid groups.

Typical examples of further substituents at the radical D are: $C_1$–$C_4$alkyl groups such as methyl, ethyl, propyl, isopropyl and butyl; $C_1$–$C_4$alkoxy groups such as methoxy, ethoxy, propoxy, isopropoxy and butoxy; $C_1$–$C_6$acylamino groups such as acetylamino and propionylamino, benzoylamino, amino, $C_1$–$C_4$alkylamino, phenylamino, $C_1$–$C_4$alkoxycarbonyl, nitro, cyano, trifluoromethyl, halogen such as fluorine, chlorine and bromine, sulfamoyl, carbamoyl, ureido, carboxy, hydroxy, sulfomethyl and sulfo.

Substituents present in those reactive dyes, wherein D is the radical of an azo dye, are in particular methyl, ethyl, methoxy, ethoxy, benzoylamino, amino, acetylamino, ureido, sulfomethyl, hydroxy, carboxy, halogen or sulfo.

A $C_1$–$C_4$alkyl radical R in formula (2) can be further substituted, e.g. by halogen, hydroxy, cyano, alkoxy, carboxy or sulfo.

Representative examples of R are the following substituents: methyl, ethyl, propyl, isopropyl, butyl, isobutyl, sec-butyl, tert-butyl, carboxymethyl, β-carboxyethyl, β-carboxypropyl, methoxycarbonylmethyl, ethoxycarbonylmethyl, β-methoxyethyl, β-ethoxyethyl, β-methoxypropyl, β-chloroethyl, γ-chloropropyl, γ-bromopropyl, β-hydroxyethyl, β-hydroxybutyl, β-cyanoethyl, sulfomethyl, β-sulfoethyl, aminosulfonylmethyl and β-sulfatoethyl.

The dyes of the formula (1) contain at least one fibre-reactive radical. By fibre-reactive compounds are meant those compounds which are able to react with the hydroxyl groups of cellulose or with the amino, hydroxy or thiol groups of natural or synthetic polyamides to form covalent bonds.

It is preferred to use reactive dyes of the formula (1) or (2), wherein Y is vinylsulfonyl, sulfatoethylsulfonyl, α-bromoacryloyl, α,β-dibromopropionyl, halopyrimidinyl or halotriazinyl, with the same proviso as for formula (1). It is most preferred to use reactive dyes of the formula (1) or (2), wherein Y is 2,4-difluoro-5-chloropyrimid-6-yl or an aminofluoro-s-triazinyl radical, the amino group of which may be unsubstituted or substituted.

The reactive dyes of the formula (1) used in this invention are known. They can be prepared by introducing the reactive radicals Y into a dye containing the radical D or into a dye precursor, in a manner known per se, and, if dye precursors are used, converting these into the desired final dyes.

It is preferred to introduce reactive dyes containing one or two free amino groups by acylation using fibre-reactive acylating agents.

The process variant in which dyestuff precursors are used as starting materials is suitable for obtaining reactive dyes of the formula (1), wherein D is the radical of a dye consisting of two or more than two components. Examples of such dyes consisting of two or more components are monoazo, disazo, metal complex azo, formazan and azomethine dyes.

If the dye is e.g. an azo dye, it is possible to react a diazo component which, in addition to containing the amino group to be diazotised, contains an —N(R)H group, or a coupling component which contains an —N(R)H group, with a fibre-reactive acyl halide, and subsequently to convert the resultant product into the desired azo dye by coupling to the other component, and then optionally to carry out a further conversion reaction.

By means of this process variant it is possible to prepare reactive dyes of the formula (1) which contain two reactive radicals by using a diazo component and coupling component which each contain an —N(R)H group, and carrying out acylation before or after the coupling.

Dyes of the formula (1) which contain two reactive radicals can also be prepared by using dyes which already contain a reactive radical in the radical D, or which contain two —N(R)H groups, and acylating them together. If the reactive dyes so prepared contain groups which are capable of metal complexing, then the reactive dyes can also subsequently be metallised. It is preferred to introduce the reactive group after metallising.

In principle, the reactive dyes of the formula (1) of all dye classes can be prepared in a manner known per se, or by methods analogous to known ones, by starting from precursors or intermediates of dyes which contain fibre-reactive radicals or by introducing these fibre-reactive radicals into intermediates of dyestuff character which are suitable for this purpose.

The acylation of the amino dyes or the dyestuff precursors with the acyl halides is carried out by methods which are known per se, preferably in aqueous solution or suspension and in the presence of alkaline acid acceptors, e.g. aqueous alkali metal hydroxides, carbonates or bicarbonates.

A further conversion reaction, which can sometimes be carried out immediately after the synthesis, comprises treating a reactive dye of the formula (1) which contains an $\alpha,\beta$-dibromopropionylamino radical with a dehydrohalogenating agent such as sodium hydroxide, so that the $\alpha,\beta$-dibromopropionyl group is converted into the $\alpha$-bromoacryloyl group.

The formation of the fibre-reactive group or groups attached direct to the radical D, e.g. the $\beta$-sulfatoethyl group, is effected in a manner known per se, e.g. by sulfating a $\beta$-oxyethylsulfonyl group present in the radical D.

Dyes of the formula (1) which contain three or four reactive radicals can be prepared by using dyes which contain in the radical D three or four radicals which can be converted into fibre-reactive groups, or which contain two such radicals, suitable fibre-reactive starting materials being those which contain a second reactive radical attached to one reactive radical, e.g. the 2-($\beta$-sulfatoethylsulfonylethylamino)-4-fluoro- or -4-chlorotriazinyl radical.

Possible starting materials which can be used for the preparation of the reactive dyes of the formula (1) are listed individually below. Suitable amino dyes are, in particular, those dyes of the following structural formulae:

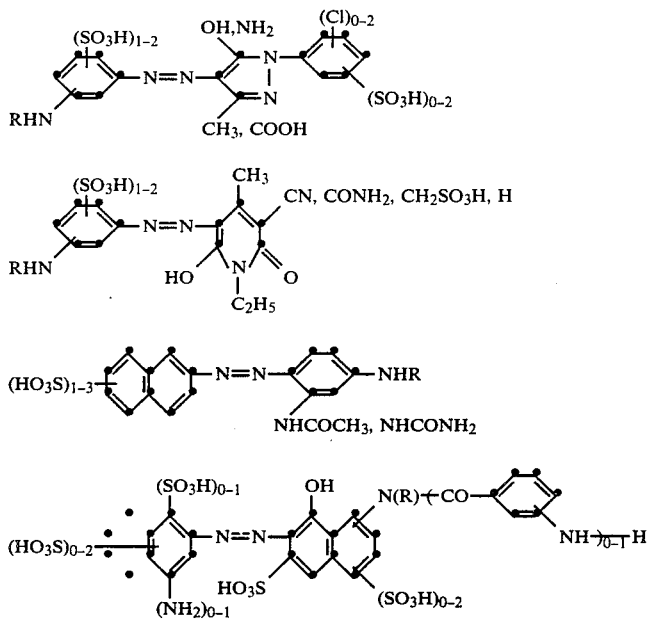

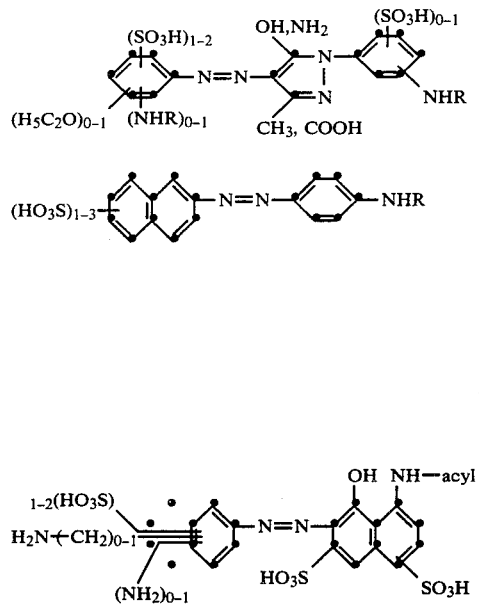

wherein acyl is e.g. acetyl or unsubstituted or substituted benzoyl.

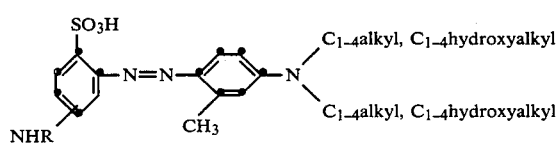

Metal complexes of dyes of the formulae

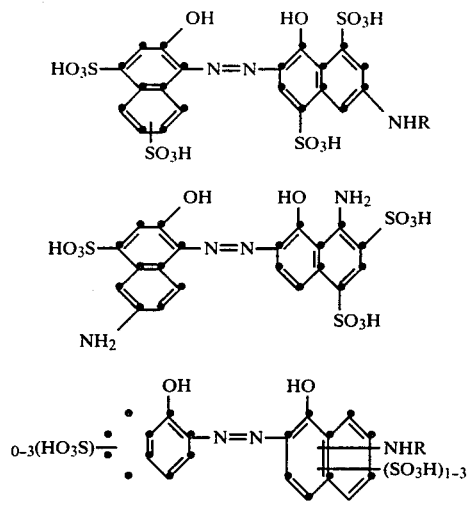

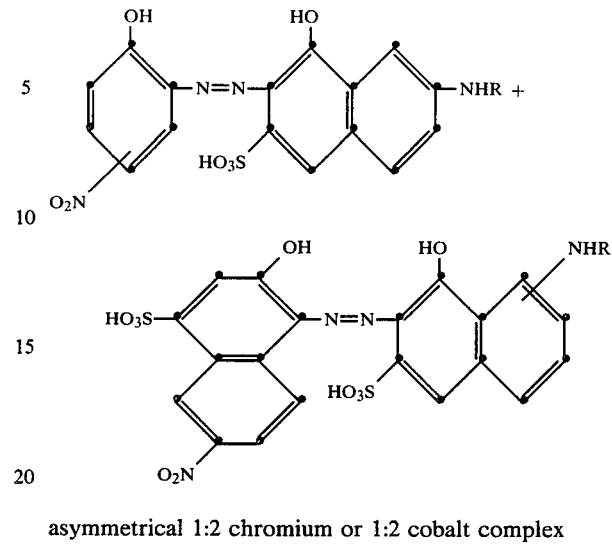

asymmetrical 1:2 chromium or 1:2 cobalt complex

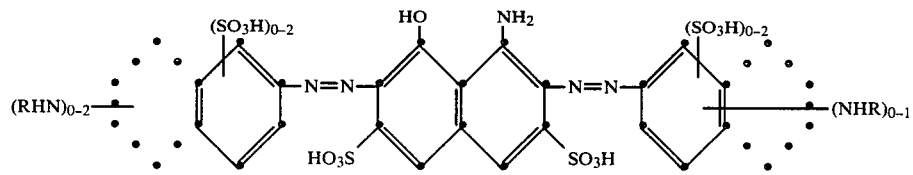

The preferred metal atom is Cu (1:1 complex) or Cr and Co (1:2 complex). Chromium and cobalt complexes may contain the azo compound of the above formula once or twice, i.e. they may have a symmetrical structure or an unsymmetrical structure with any other ligand groups.

The condensed rings indiated by dotted lines denote possible alternative naphthalene systems.

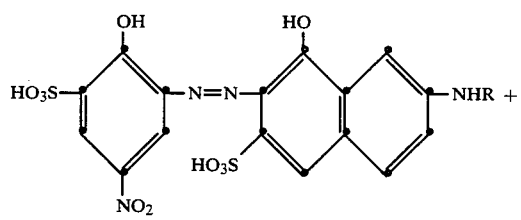

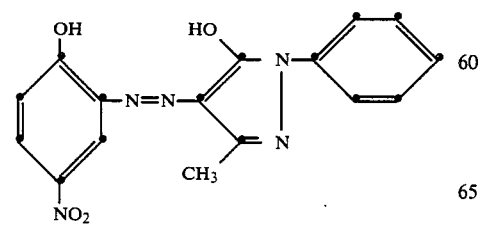

asymmetrical 1:2 chromium complex

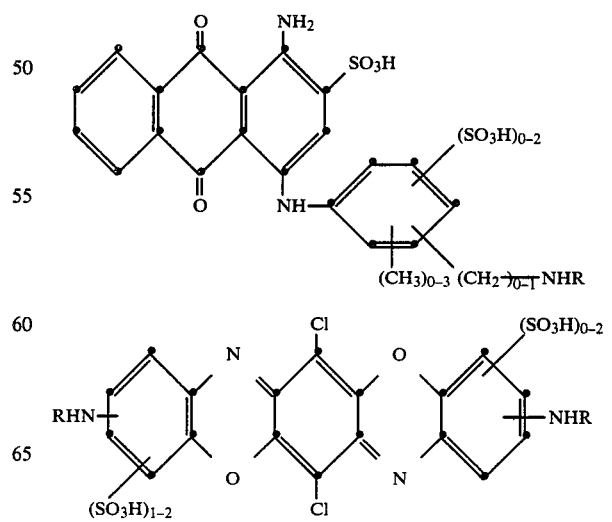

-continued

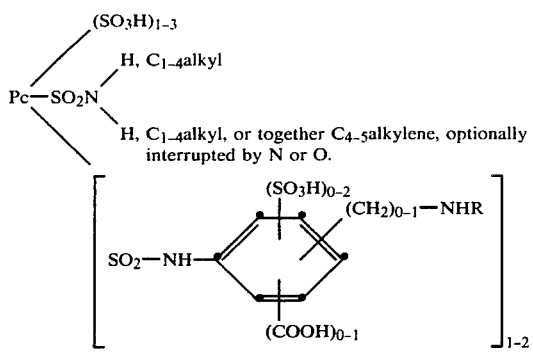

In this formula, PC is the Cu- or Ni-phthalocyanine radical. The total number of substituents at the Pc nucleus is 4.

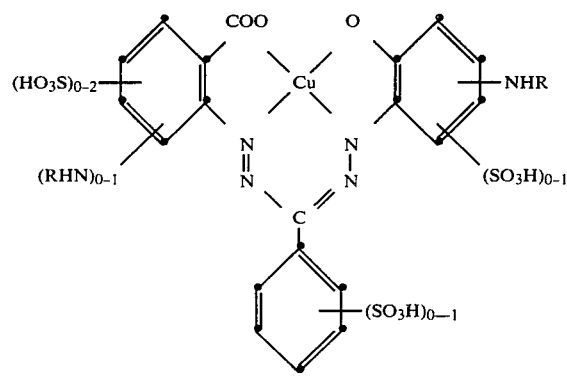

The dyes of the above formulae can be further substituted in the alkyl or aryl moieties, in particular by the substituents specified above in the definition of D in formula (1).

Particularly important azo dyes of the formula (2) are the following:

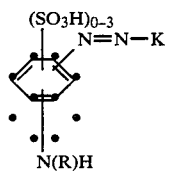

and

-continued

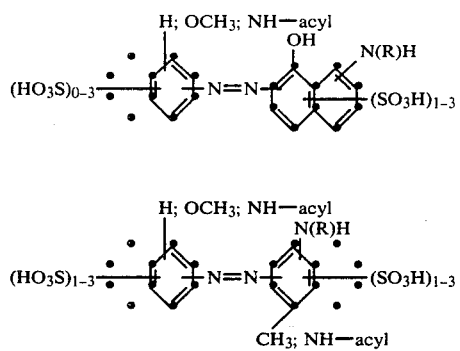

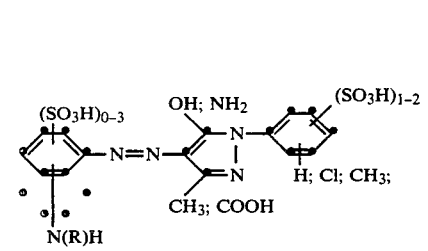

wherein K is the radical of a coupling component of the benzene, naphthalene or heterocyclic series, acyl is a low molecular aliphatic acyl radical containing not more than 3 carbon atoms or is an aromatic radical containing not more than 8 carbon atoms, and R is as defined for formula (2);

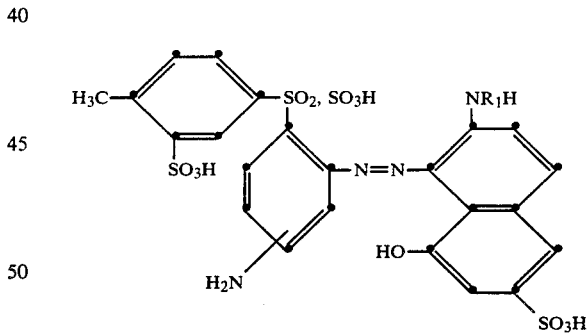

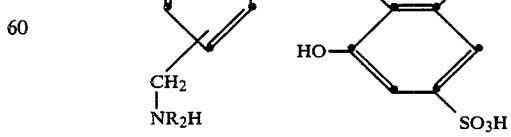

wherein each of $R_1$ and $R_2$ independently is hydrogen or methyl;

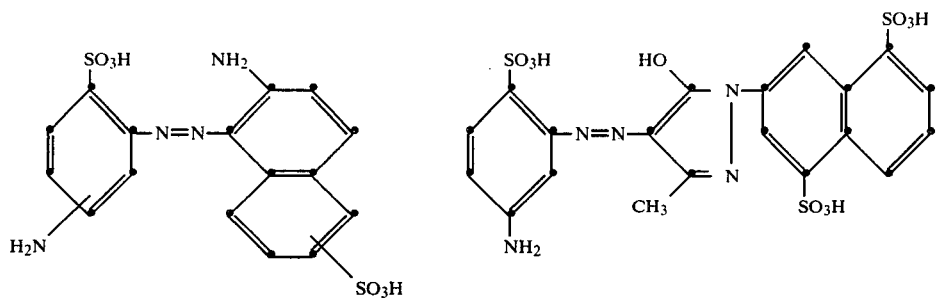
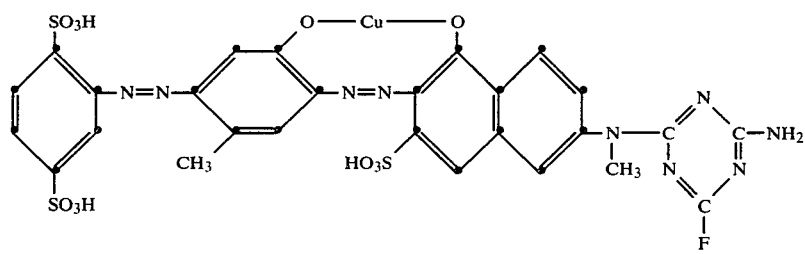
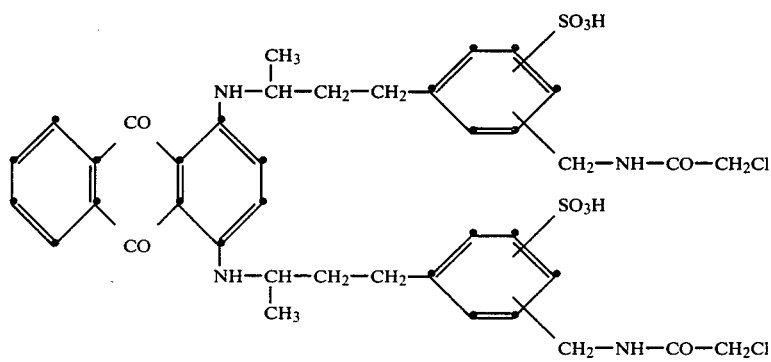
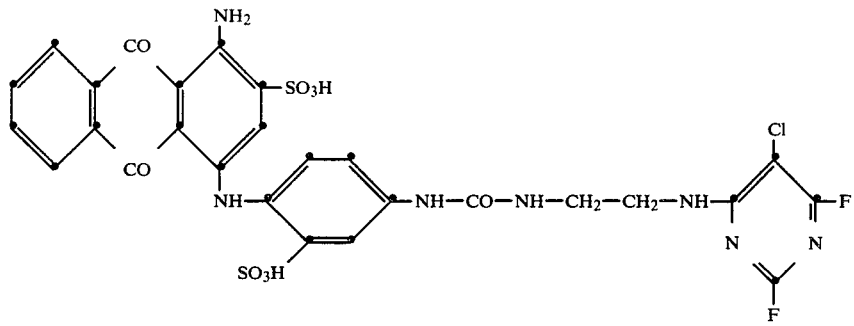
as well as the metal complex azo dyes of the formulae
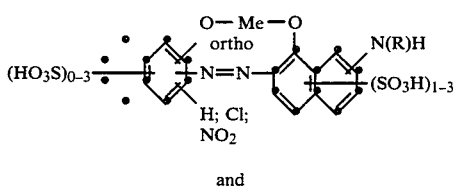
and
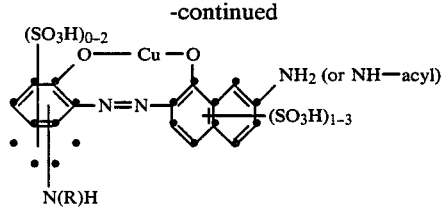
wherein R and acyl have the meanings assigned to them above and Me is Cu, Cr or Co.
If the starting materials employed for obtaining the preferred reactive dyes of the formula (1), wherein D is the radical of an azo dye, are not final amino dyes, e.g.

those described above, but dyestuff precursors, i.e. the diazo and coupling components, then these are e.g.:

DIAZO COMPONENTS aminobenzene, 1-amino-2-, -3- or -4-methylbenzene, 1-amino-2-, -3- or -4-methoxybenzene, 1-amino-2-, -3- or -4-chlorobenzene, 1-amino-2,5-dichlorobenzene, 1-amino-2,5-dimethylbenzene, 1-amino-3-methyl-6-methoxybenzene, 1-amino-2-methoxy-4-nitrobenzene, 4-aminodiphenyl, 1-aminobenzene-2-, -3- or -4-carboxylic acid, 2-aminodiphenylether, 1-aminobenzene-2-, -3- or -4-sulfonamide, -N-methylamide, -N-ethylamide, -N,N-dimethylamide or -N,N-diethylamide, dehydrothio-p-toluidine-sulfonic acid, 1-amino-3-trifluoromethylbenzene-6-sulfonic acid, 1-amino-3- or -4-nitrobenzene, 1-amino-3- or -4-acetylaminobenzene, 1-aminobenzene-2-, -3- or -4-sulfonic acid, 1-aminobenzene-2,4- and -2,5-disulfonic acid, 1-amino-4-methylbenzene-2-sulfonic acid, 1-amino-3-methylbenzene-6-sulfonic acid, 1-amino-6-methylbenzene-3- or -4-sulfonic acid, 1-amino-2-carboxybenzene-4-sulfonic acid, 1-amino-4-carboxybenzene-2-sulfonic acid, 1-amino-4- or -5-chlorobenzene-2-sulfonic acid, 1-amino-6-chlorobenzene-3- or -4-sulfonic acid, 1-amino-3,4-dichlorobenzene-6-sulfonic acid, 1-amino-2,5-dichlorobenzene-6-sulfonic acid, 1-amino-2,5-dichlorobenzene-4-sulfonic acid, 1-amino-4-methyl-5-chlorobenzene-2-sulfonic acid, 1-amino-5-methyl-4-chlorobenzene-2-sulfonic acid, 1-amino-4-or -5-methoxybenzene-2-sulfonic acid, 1-amino-6-methoxybenzene-3- or -4-sulfonic acid, 1-amino-6-ethoxybenzene-3- or -4-sulfonic acid, 1-amino-2,4-dimethoxybenzene-6-sulfonic acid, 1-amino-2,5-dimethoxybenzene-4-sulfonic acid, 1-amino-3-acetylaminobenzene-6-sulfonic acid, 1-amino-4-acetylaminobenzene-2-sulfonic acid, 1-amino-3-acetylamino-4-methylbenzene-6-sulfonic acid, 2-amino-1-methylbenzene-3,5-disulfonic acid, 1-amino-4-methoxybenzene-2,5-disulfonic acid, 1,3-diaminobenzene-4-sulfonic acid, 1,4-diaminobenzene-3-sulfonic acid, 1,4-diaminobenzene-3-sulfonic acid, 1,4-diaminobenzene-2,5-disulfonic acid, 1-amino-3- or -4-nitrobenzene-6-sulfonic acid, 1-aminonaphthalene, 2-aminonaphthalene, 1-aminonaphthalene-2-, -4-, -5-, -6-, -7- or -8-sulfonic acid, 2-aminonaphthalene-1-, -3-, -4-, -5-, -6-, -7- or -8-sulfonic acid, 1-aminonaphthalene-3,6- or -5,7-disulfonic acid, 2-aminonaphthalene-1,5-, -1,7-, -3,6-, -5,7-, -4,8 or -6,8-disulfonic acid 1-aminonaphthalene-2,5,7-trisulfonic acid, 2-aminonaphthalene-1,5,7-, 3,6,8- or -4,6,8-trisulfonic acid, 1-hydroxy-2-aminobenzene-4-sulfonic acid, 1-hydroxy-2-aminobenzene-5-sulfonic acid, 1-hydroxy-2-aminobenzene-4,6-disulfonic acid, 1-hydroxy-2-amino-4-acetylamino-benzene-6-sulfonic acid, 1-hydroxy-2-amino-6-acetylaminobenzene-4-sulfonic acid, 1-hydroxy-2-amino-4-chlorobenzene-5-sulfonic acid, 1-hydroxy-2-amino-4-methylsulfonyl benzene' 1-amino-2-hydroxy-6-nitronaphthalene-4-sulfonic acid, 2-amino-1-hydroxynaphthalene-4,8-disulfonic acid, 4-aminoazobenzene-3,4'-disulfonic acid, 3-methoxy-4-amino-6-methylazobenzene-2',4'-disulfonic acid, 3-methoxy-4-amino-6-methylazobenzene-2',5'-disulfonic acid.

COUPLING COMPONENTS phenol, 1-hydroxy-3- or -4-methylbenzene, 1-hydroxybenzene-4-sulfonic acid, 1-hydroxynaphthalene, 2-hydroxynaphthalene, 2-hydroxynaphthalene-6- or -7-sulfonic acid, 2-hydroxynaphthalene-3,6- or -6,8-disulfonic acid, 1-hydroxynaphthalene-4-sulfonic acid, 1-hydroxynaphthalene-4,6- or -4,7-disulfonic acid, 1-amino-3-methylbenzene, 1-amino-2-methoxy-5-methylbenzene, 1-amino-2,5-dimethylbenzene, 3-aminophenylurea, 1-amino-3-acetylaminobenzene, 1-amino-3-hydroxyacetylaminobenzene, 1,3-diaminobenzene-4-sulfonic acid, 1-aminonaphthalene-6- or -8-sulfonic acid, 1-amino-2-methoxynaphthalene-6-sulfonic acid, 2-aminonaphthalene-5,7-disulfonic acid, 1-amino-8-hydroxynaphthalene-6-sulfonic acid, 1-amino-8-hydroxynaphthalene-2,4-disulfonic acid, 2-hydroxy-3-aminonaphthalene-5,7-disulfonic acid, 1-amino-8-hydroxynaphthalene-2,4,6-trisulfonic acid, 1-hydroxy-8-acetylaminonaphthalene-3-sulfonic acid, 1-benzoylamino-8-hydroxynaphthalene-3,6- or -4,6-disulfonic acid, 2-benzoylamino-5-hydroxynaphthalene-7-sulfonic acid, 2-amino-5-hydroxynaphthalene-7-sulfonic acid, 2-methyl- or 2-ethylamino-5-hydroxynaphthalene-7-sulfonic acid, 2-(N-acetyl-N-methylamino)-5-hydroxynaphthalene-7-sulfonic acid, 2-acetylamino-5-hydroxynaphthalene-7-sulfonic acid, 2-amino-5-hydroxynaphthalene-1,7-disulfonic acid, 2-amino-8-hydroxynaphthalene-6-sulfonic acid, 2-methyl- or -ethylamino-8-hydroxynaphthalene-6-sulfonic acid, 2-(N-acetyl-N-methylamino)-8-hydroxynaphthalene-6-sulfonic acid, 2-acetylamino-8-hydroxynaphthalene-6-sulfonic acid, 2-amino-8-hydroxynaphthalene-3,6-disulfonic acid, 2-acetylamino-8-hydroxynaphthalene-3,6-disulfonic acid, 1-amino-5-hydroxynaphthalene-7-sulfonic acid, 1-amino-8-hydroxynaphthalene-3,6- or -4,6-disulfonic acid, 1-acetylamino-8-hydroxynaphthalene-3,6- or -4,6-disulfonic acid, 1-(4'-aminobenzoylamino)-8-hydroxynaphthalene-3,6- or -4,6-disulfonic acid, 1-(3'-aminobenzoylamino)-8-hydroxynaphthalene-3,6- or -4,6-disulfonic acid, 1-(3'-nitrobenzoylamino)-8-hydroxynaphthalene-3,6- or -4,6-disulfonic acid, 2-(4'-amino-3'-sulfophenylamino)-5-hydroxynaphthalene-7-sulfonic acid, 3-methylpyrazol-5-one, 1-phenyl-3-methylpyrazol-5-one, 1-(4'-sulfophenyl)-3-methylpyrazol-5-one, 1-(4'-sulfophenyl)-pyrazol-5-one-3-carboxylic acid, 1-(3'-aminophenyl)-3-methylpyrazol-5-one, 1-(2',5'-disulfophenyl)-3-methylpyrazol-5-one, 1-(2'-methyl-4'-sulfophenyl)-pyrazol-5-one-3-carboxylic acid, 1-(4',8'-disulfonaphthaly-[2']-3-methylpyrazol-5-one, 1-(5',7'-disulfonaphthyl-[2']-3-methylpyrazol-5-one, 1-(2',5'-dichloro-4'-sulfophenyl)-3-methylpyrazol-5-one, 3-aminocarbonyl-4-methyl-6-hydroxypyrid-2-one, 1-ethyl-3-cyano- or -3-chloro-4-methyl-6-hydroxypyrid-2-one, 1-ethyl-3-sulfomethyl-4-methyl-6-hydroxypyrid-2-one, 2,4,6-triamino-3-cyanopyridine, 2-(3'-sulfophenylamino)-4,6-diamino-3-cyanopyridine, 2-(2'-hydroxyethylamino)-3-cyano-4-methyl-6-aminopyridine, 2,6-bis-(2'-hydroxyethylamino)-3-cyano-4-methylpyridin, 1-ethyl-3-carbamoyl-4-methyl-6-hydroxypyrid-2-one, 1-ethyl-3-sulfomethyl-4-methyl-5-carbamoyl-6-hydroxypyrid-2-one, N-acetoacetylaminobenzene, 1-(N-acetoacetylamino)-2-methoxybenzene-5-sulfonic acid, 4-hydroxyquinol-2-one, 1-amino-8-hydroxy-2-(phenylazo)-naphthalene-3,6-disulfonic acid, 1-amino-8-hydroxy-2-(4'-sulfophenylazo)-naphthalene-3,6-disulfonic acid, 1-amino-8-hydroxy-2-(2',5'-disulfophenylazo)-naphthalene-3,6-disulfonic acid.

If dyestuff precursors are used as starting materials, at least one of the two components (diazo component or coupling component) must contain an acylatable amino group. The diazotisation of the intermediates which contain a diazotisable amino group is normally carried out by treatment with nitrous acid in an aqueous solution of mineral acid at low temperature, and the coupling is carried out at weakly acid, neutral or weakly alkaline pH values. Suitable acylating agents which, in addition to the acylating position, also contain a reactive radical which is able to form a covalent bond with silk, are in particular the halides or anhydrides of organic acids which contain easily replaceable atoms or groups of atoms.

Examples of such acylating agents are:

chloro- or bromoacetyl chloride, β-chloro- or β-bromopropionyl chloride, α,β-dichloro- or α,β-dibromopropionyl chloride, chloromaleic anhydride, carbyl sulfate, acryloyl chloride, β-chloro-or β-bromoacryloyl chloride, α-chloro- or α-bromoacryloyl chloride, α,β-dichloro- or α,β-dibromoacryloyl chlroide, trichloroacryloyl chloride, chlorocrotonyl chloride, propiolyl chloride, 3,5-dinitro-4-chlorobenzenesulfochloride or 3,5-dinitro-4-chlorobenzenecarboxylic acid chloride, 3-nitro-4-chlorobenzenesulfochloride or 3-nitro-4-chlorobenzenecarboxylic acid chloride, 2,2,3,3-tetrafluorocyclobutane-1-carboxylic acid chloride, 2,2,3,3-tetrafluorocyclobutyl-acryloyl chloride, β-chloroethylsulfonyl-endomethylenecyclohexanecarboxylic acid chloride, acrylsulfonyl-endomethylenecyclohexanecarboxylic acid chloride, 2-chlorobenzoxazolecarboxylic acid chloride, 2-chlorobenzthiazolecarboxylic acid chloride, 2-chlorobenzthiazolesulfonic acid chloride, 4,5-dichloro-1-phenylpyridazonecarboxylic acid chloride or 4,5-dichlorophenylpyridazonesulfochloride, 4,5-dichloropyridazolpropionyl chloride, 1,4-dichlorophthalazinecarboxylic acid chloride or 1,4-dichlorophthalazine-sulfochloride, 2,3-dichloroquinoxalinecarboxylic acid chloride or 2,3-dichloroquinoxaline-sulfochloride, 2,4-dichloroquinazolinecarboxylic acid chloride or 2,4-dichloroquinoxalinesulfochloride, 2-methanesulfonyl-4-chloro-6-methylpyrimidine, 2,4-bis-methanesulfonyl-6-methylpyrimidine, 2,4,6-tri-or 2,4,5,6-tetra-chloropyrimidine, 2,4,6-tri- or 2,4,5,6-tetra-bromopyrimidine, 2-methanesulfonyl-4,5-dichloro-6-methylpyrimidine, 2,4-dichloropyrimidine-5-sulfonic acid, 5-nitro- or 5-cyano-2,4,6-trichloropyrimidine, 2,6-bis-methanesulfonylpyridine-4-carboxylic acid chloride, 2,4-dichloro-5-chloromethyl-6-methylpyrimidine, 2,4-dibromo-5-bromomethyl-6-methylpyrimidine, 2,4-dichloro-5-chloromethylpyrimidine, 2,4-dibromo-5-bromomethylpyrimidine, 2,5,6-trichloro-4-methylpyrimidine, 2,6-dichloro-5-trichloromethylpyrimidine, 2,4-bismethylsulfonyl-5-chloro-6-methylpyrimidine, 2,4,6-trimethylsulfonyl-1,3,5-triazine, 2,4-dichloropyrimidine, 3,6-dichloropyridazine, 3,6-dichloropyridazine-5-carboxylic acid chloride, 2,6-dichloro- or 2,6-dibromo-4-carboethoxypyrimidine, 2,4,5-trichloropyrimidine, 2,4-dichloropyrimidine-6-carboxylic acid chloride, 2,4-dichloropyrimidine-5-carboxylic acid chloride, 2,6-dichloro- or 2,6-dibromopyrimidine-4- or -5-carboxamide or -sulfonamide or -4- or -5-sulfochloride, 2,4,5,6-tetrachloropyridazine, 5-bromo-2,4,6-trichloropyrimidine, 5-acetyl-2,4,6-trichloropyrimidine, 5-nitro-6-methyl-2,4-dichloropyrimidine, 2-chlorobenzthiazole-6-carboxylic acid chloride, 2-chlorobenzthiazole-6-sulfochloride, 5-nitro-6-methyl-2,4-dichloropyrimidine, 2,4,6-trichloro-5-bromopyrimidine, 2,4,5,6-tetrafluoropyrimidine, 4,6-difluoro-5-chloropyrimidine, 2,4,6-trifluoro-5-chloropyrimidine, 2,4,5-trifluoropyrimidine, 2,4,6-trichloro-(-tribromo- or -trifluoro)-s-triazine, and also 4,6-dichloro(-dibromo- or -difluoro)-s-triazine which are substituted in the 2-position by an aryl or alkyl radical, for example a phenyl, methyl or ethyl radical, or by the radical of an aliphatic or aromatic hydroxyl compound which is bonded through the sulfur atom or through the oxygen atom, or in particular by a —NH$_2$ group or by the radical of an aliphatic, heterocyclic or aromatic amino compound which is bonded through the nitrogen atom.

The 4,6-dihalo-s-triazines which are substituted in the 2-position are obtained, for example, by reaction of trihalo-s-triazines with the above amino, hydroxyl or mercapto compounds. The substituent in the 2-position of a 4,6-dihalo-s-triazine can be for example the radical of one of the following compounds:

ammonia, methylamine, dimethylamine, ethylamine, diethylamine, propylamine, isopropylamine, butylamine, dibutylamine, isobutylamine, sec-butylamine, tert-butylamine, hexylamine, methoxyethylamine, ethoxyethylamine, methoxypropylamine, chloroethylamine, hydroxyethylamine, dihydroxyethylamine, hydroxypropylamine, aminoethanesulfonic acid, β-sulfatoethylamine, benzylamine, cyclohexylamine, aniline, o-, m- and p-toluidine, 2,3-, 2,4-, 2,5-, 2,6-, 3,4- and 3,5-dimethylaniline, o-, m- and p-chloroaniline, N--methylaniline, N-ethylaniline, 3- or 4-acetylaminoaniline, 2,5-dimethoxyaniline, o-, m- and p-anisidine, o-, m- and p-phenetidine, 1-naphthylamine, 2-naphthylamine, 2-amino-1-hydroxynaphthalene, 1-amino-4-hydroxynaphthalene, 1-amino-8-hydroxy-naphthalene, 1-amino-2-hydroxy-naphthalene, 1-amino-7-hydroxy-naphthalene, orthanilic acid, metanilic acid, sulfanilic acid, aniline-2,4-disulfonic acid, aniline-2,5-disulfonic acid, anthranilic acid, m- and p-aminobenzoic acid, 2-aminotoluene-4-sulfonic acid, 2-aminotoluene-5-sulfonic acid, p-aminosalicyclic acid, 1-amino-4-carboxybenzene-3-sulfonic acid, 1-amino-2-carboxybenzene-5-sulfonic acid, 1-amino-5-carboxyenzene-2-sulfonic acid, 1-naphthylamine-2-, -3-, -4-, -5-, -6-, -7- and -8-sulfonic acid, 2-naphthylamine-1-, -3-, -4-, -5-, -6-, -7- and -8-sulfonic acid, 1-naphthylamine-2,4-, -2,5-, -2,7-, -2,8-, -3,5-, -3,6-, -3,7-, -3,8-, -4,6-, -4,7-, -4,8-, and -5,8-disulfonic acid, 2-naphthylamine-1,5-, -1,6-, -1,7-, -3,6-, -3,7-, -4,7-, -4,8-, -5,7- and -6,8-disulfonic acid, -1-naphthylamine-2,4,6-, -2,4,7-, -2,5,7-, -3,5,7-, -3,6,8- and -4,6,8-trisulfonic acid, 2-naphthylamino-1,3,7-, -1,5,7-, -3,5,7-, -3,6,7-, -3,6,8- and -4,6,8-trisulfonic acid, 2-, 3- and 4-aminopyridine, 2-aminobenzthiazole, 5-, 6- and 8-aminoquinoline, 2-aminopyrimidine, morpholino, piperidine, piperazine, water, methanol, ethanol, propanol, isopropanol, n-butanol, isobutanol, sec-butanol, tert-butanol, hexanol, cyclohexanol, β-methoxyethanol, β-ethoxyethanol, γ-methoxypropanol, γ-ethoxypropanol, β-ethoxy-β-ethoxyethanol, glycolic acid, phenol, o-, m- and p-chlorophenol, o-, m- and p-nitrophenol, o-, m- and p-hydroxybenzoic acid, o-, m- and p-phenolsulfonic acid, phenol-2,4-disulfonic acid, α-naphthol, β-naphthol, 1-hydroxynaphthalene-8-sulfonic acid, 2-hydroxynaphthalene-1-sulfonic acid, 1-hydroxynaphthalene-5-sulfonic acid, 1-hydroxynaphthalene-4-sulfonic acid, 1-hydroxynaphthalene-6- or -7-sulfonic acid, 2-hydroxynaphthalene-6-, -7- or -8-sulfonic acid, 2-hydroxynaphthalene-4-sulfonic acid, 2-hydroxynaphthalene-4,8- or -6,8-disulfonic acid, 1-hydroxynaphthalene-4,8-disulfonic acid, 2-hydroxynaphthalene-3,6-disulfonic acid, methanethiol, ethanethiol, propanethiol, isopropanethiol, n-butanethiol, thioglycollic acid, thiourea, thiophenol, α-thionaphthol, β-thionaphthol.

Also suitable are 4,6-dihalo-s-triazines which contain in the 2-position one of the fibre-reactive substituents mentioned above, e.g. 4,6-difluoro-2-(β-sulfatoethylsulfonylethylamino)-s-triazine.

Further eligible compounds are those of dyestuff character, for example 4-nitro-4'-aminostilbenedisulfonic acid, 2-nitro-4'-amino-diphenylamino-4,3'-stilbenedisulfonic acid, 2-nitro-4'-aminodiphenylamino-4,3'-disulfonic acid and, in particular, aminoazo dyes or aminoanthraquinones or phthalocyanines which additionally contain at least one reactive amino group.

The introduction of the substituent in the 2-position of the triazine radical can also be performed after coupling or metallisation. Accordingly, one of the above amino, hydroxy or mercapto compounds can be condensed subsequently with a dihalo-s-triazine radical which is already attached to the azo dye.

Examples of useful aminofluorotriazines are:

2-amino-4,6-difluoro-s-triazine, 2-phenylamino-4,6-difluoro-s-triazine, 2-N-methyl-N-phenylamino-4,6-difluoro-s-triazine, 2-(methylphenylamino)-4,6-difluoro-s-triazine, 2-(chlorophenylamino)-4,6-difluoro-s-triazine, 2-(sulfophenylamino)-4,6-difluoro-s-triazine, 2-N-methyl-N-(methylphenylamino)-4,6-difluoro-s-triazine, 2-N-methyl-N-(chlorophenylamino)-4,6-difluoro-s-triazine, 2-N-methyl-N-(sulfophenylamino)-4,6-difluoro-s-triazine and —2-(chloroethylsulfonylethylamino)-4,6-difluoro-s-triazine. In addition to the reactive radicals which can be introduced by acylation, other suitable reactive radicals are the vinylsulfone, β-sulfatoethylsulfone or thiosulfatoethylsulfone, β-thiosulfatopropionylamide, β-thiosulfatoethylsulfonylamide or sulfonic acid N,β-sulfatoethylamide group, which radicals are introduced into the diazo component by other means, e.g. by ester or thioester formation.

Examples of those dyes into which a further reactive radical group can be introduced by acylation are:

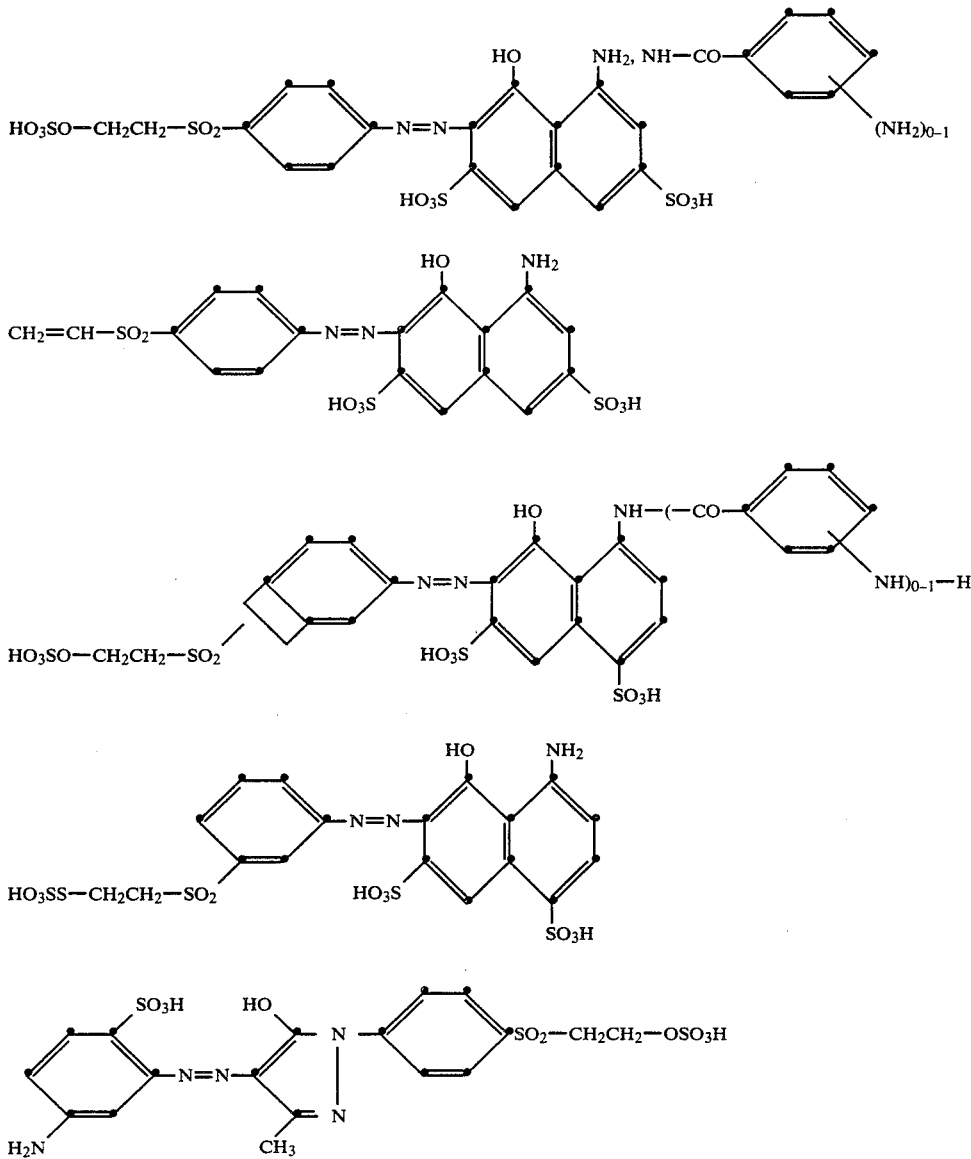

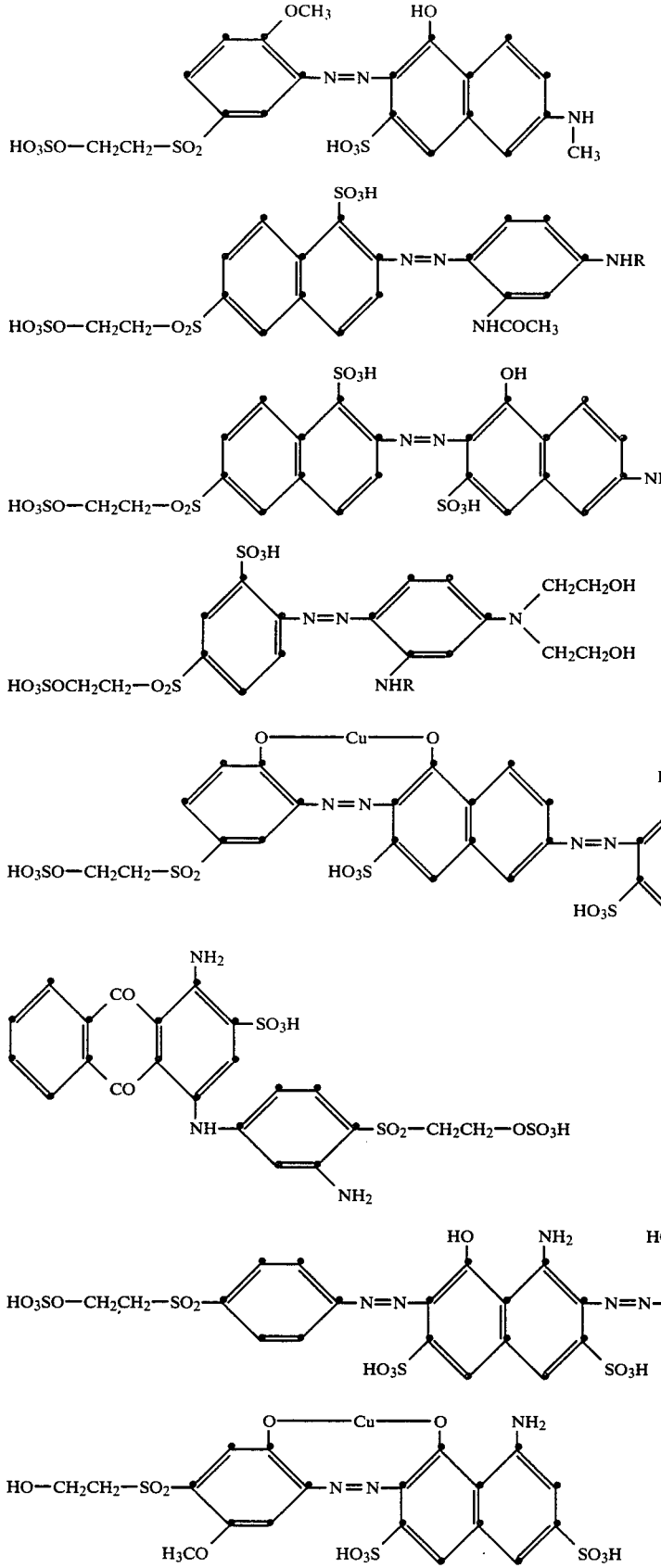

-continued
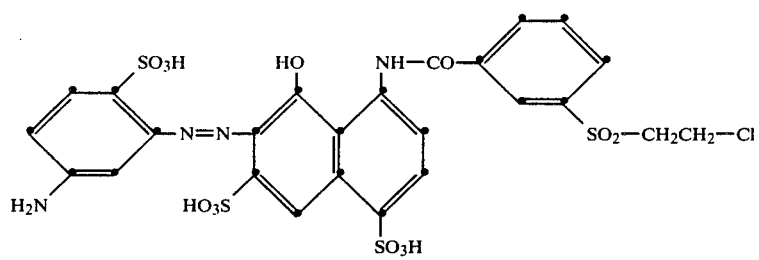
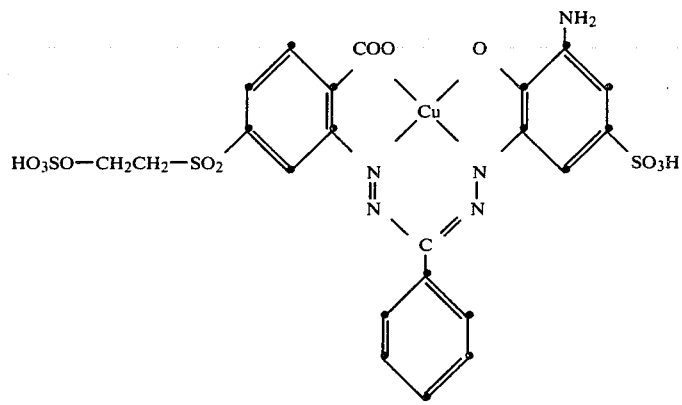
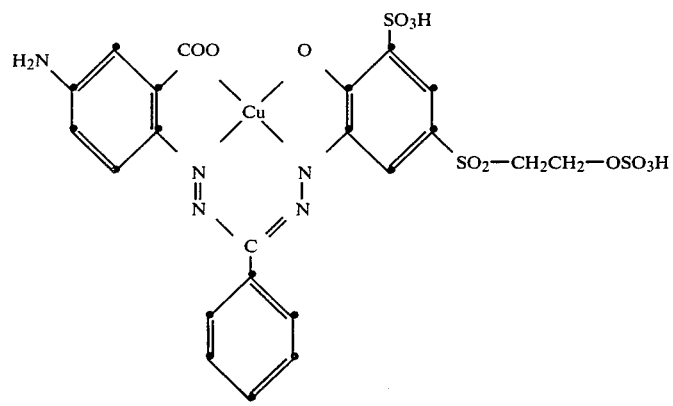
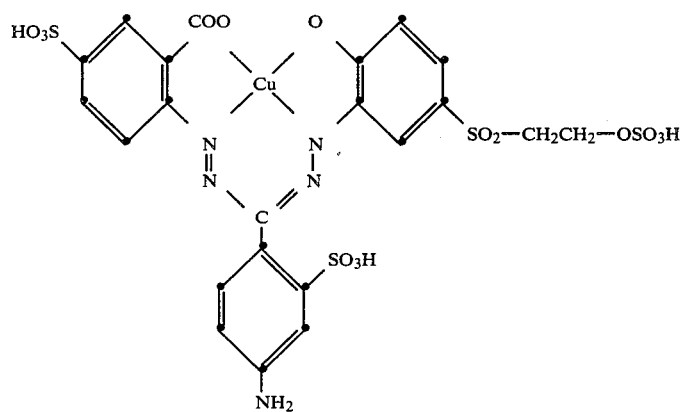

-continued
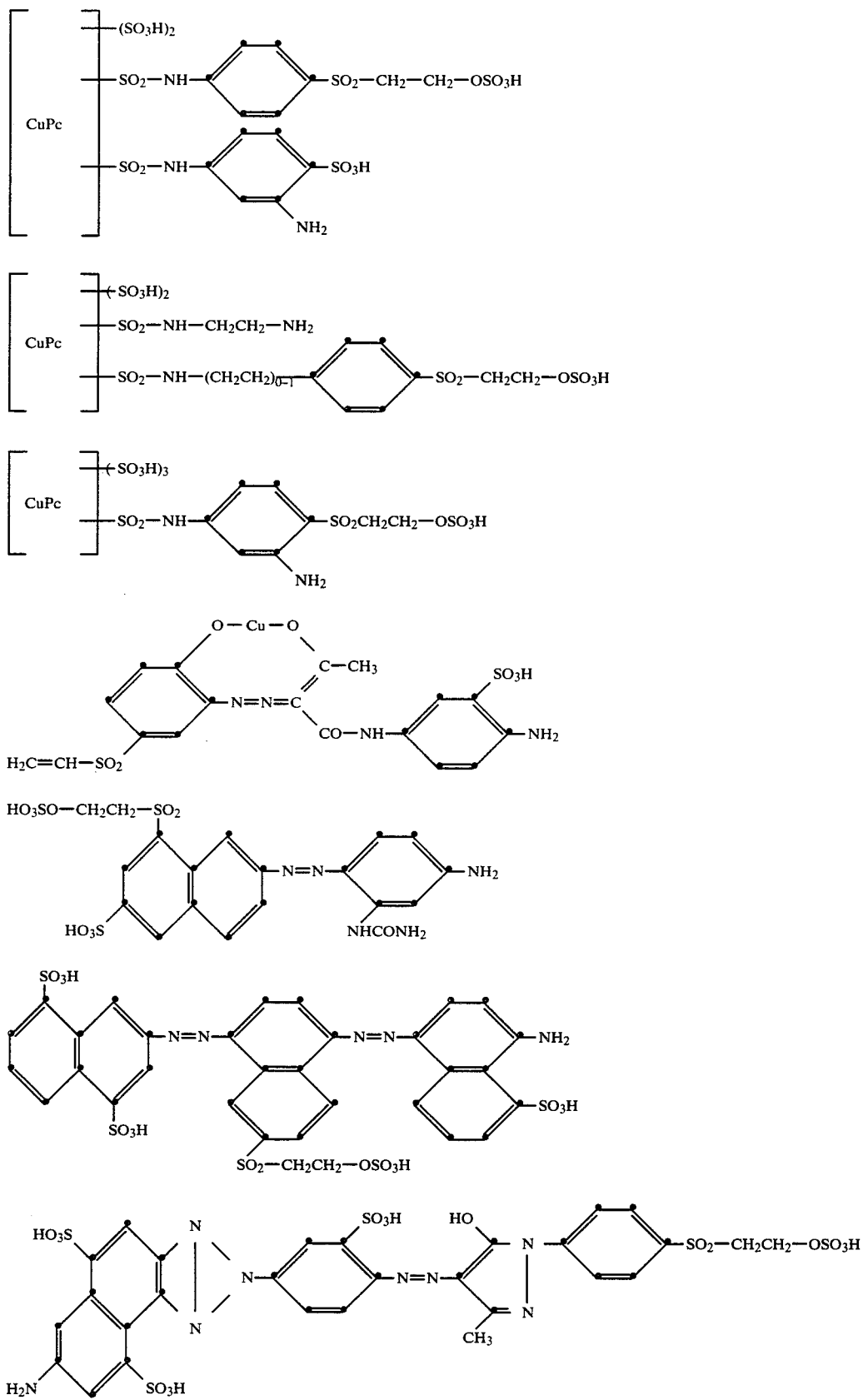

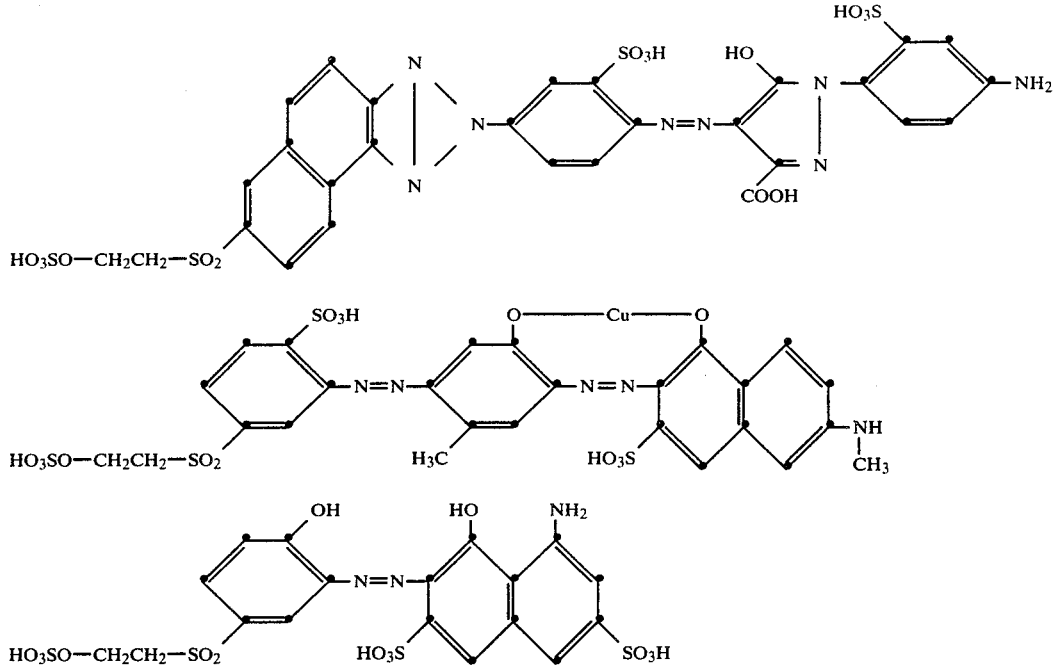

1:2 chromium complex

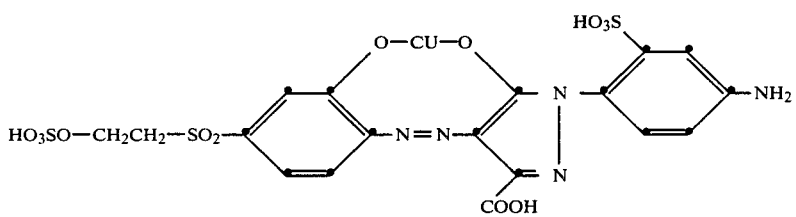

Examples of further monoreactive dyes containing a free amino group are:

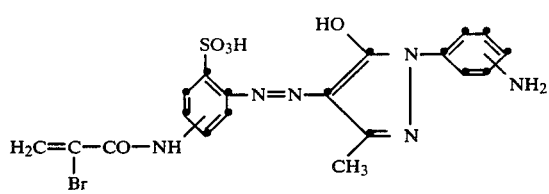

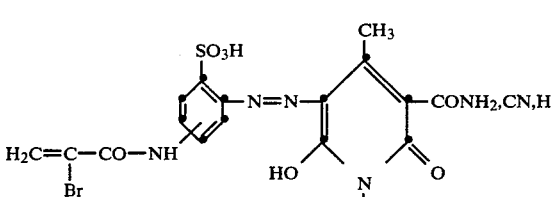

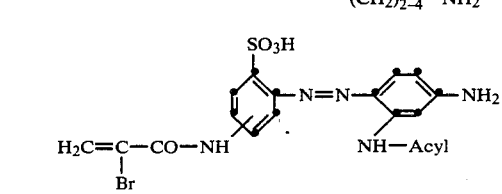

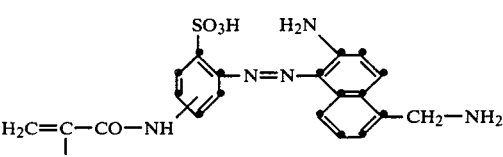

Mention may also be made of those reactive compounds which can also be obtained via appropriate methylol compounds by the method of Einhorn, e.g. 1-amino-3-chloroacetylaminomethylbenzene-6-sulfonic acid.

The acylation reactions with the fibre-reactive acylating agents are advantageously carried out using acid acceptors, such as sodium carbonate or sodium hydroxide, and under such conditions that replaceable halogen atoms, unsaturated bonds or the like still remain in the reactive radical, that is to say, for example, in organic solvents or at relatively low temperatures in aqueous medium.

A further utility of the process of this invention comprises dyeing or printing silk-containing fibre blends with mixtures of dyes, at least one component of which is a dye of the formula (1) and the other components are dyes which are not fibre-reactive. Silk or silk-containing fibre blends are dyed or printed by the process of the invention. Suitable silk comprises not only natural or cultured silk (mulberry silk, Bombyx mori) but also the different wild silks, especially tussah silk, and also eria and fagara silk, nester silk, Senegal silk, muga silk, as well as shell silk and spun silk. Silk-containing fibre materials are in particular blends of silk with polyester fibres, acrylic fibres, cellulose fibres, polyamide fibres or wool. The textile material can be broadly in any form of processing, e.g. fibres, yarn, wovens or knits. In the process of the present invention, dyeing or printing is carried out in aqueous medium in the temperature range from 50° to 130° C. and at pH 8 to 11. The procedure is that the material to be dyed is put into the dyebath, or printed with the aqueous printing paste, at normal or elevated temperature, the temperature of the bath or printed material is raised and, finally, the dyeing or print is fixed in the indicated temperature or pH range. The temperature interval at which dyeing or printing is best carried out depends on the material, the nature of the reactive dye and the desired colour strength. Thus cultured silk is preferably dyed (fixed) with aminofluorotriazine dyes in the temperature range from 50° to 60° C., whereas tussah silk is advantageously dyed with aminofluorotriazine dyes in the temperature range from 65° to 75° C. When using other reactive dyes, the dyeing temperature is in the range from 85° to 95° C., especially if dark shades are desired.

Dyeing is preferably carried out in the temperature range from 60° to 90° C. It is preferred to fix the dyeings towards the end of the dyeing procedure and, in particular, in the pH range from 8.5 to 9.5.

A preferred embodiment of the process comprises dyeing cultured silk (Bombyx mori) with aminofluoro-s-triazine dyes in the temperature range from 50° to 60° C. and with all other reactive dyes in the range from 60° to 80° C.

A further preferred embodiment of the process comprises dyeing tussah silk with aminofluoro-s-triazine dyes in the temperature range from 60° to 75° C. and with all other reactive dyes in the range from 70° to 100° C.

Examples of suitable alkaline acid acceptors for carrying out the process of the invention in the alkaline pH range are sodium hydroxide, potassium hydroxide or an alkali metal salt of a weak acid, e.g. sodium carbonate or sodium bicarbonate, trisodium phosphate, disodium phosphate, sodium silicate or sodium trichloroacetate, or mixtures thereof.

If dyeing is carried out by the exhaust process, the dyebath will contain one or more of the above mentioned acid acceptors and optionally other ingredients such as inorganic salts, urea, wetting agents or other assistants specified below. The goods are impregnated with the aqueous dye solutions which optionally contain salts, and the dyes are fixed by a heat treatment after treatment with alkali or in the presence of alkali.

Fixing the prints in the alkaline range by heat treatment can be effected by different methods conventionally employed in the art, for example by steaming with satuated steam at about 100°–103° C. (pad steam process) by passing the dyed or printed goods through hot solutions having a high salt concentration, or through the hot vapours of inert organic solvents, or by passing the padded or printed web of material over a series of heated rolls.

In addition to containing alkali, the dye liquors and printing pastes may also contain conventional additives. Solutions contain e.g. inorganic salts such as alkali chlorides or alkali sulfates, urea, alginate thickeners, water-soluble cellulose alkyl ethers as well as dispersants and levelling assistants. Printing pastes contain e.g. urea, sodium m-nitrobenzenesulfonate and conventional thickeners such as methyl cellulose, starch ethers, emulsion thickeners or preferably an alginate, e.g. sodium alginate. Depending on the desired depth of shade, the dyes are employed in concentrations of 0.1 to 15%.

After fixation, the dyeings or prints are thoroughly rinsed with cold and hot water, optionally with the addition of an agent which acts as a dispersant and promotes the diffusion of non-fixed dye.

A preferred embodiment of the process comprises washing off the dyed goods in an aqueous wash liquor at pH 8.5 to 9 and elevated temperature, preferably in the range from 70° to 80° C., optionally in the presence of a non-ionic detergent.

It is preferred to carry out the process of the present invention by the exhaust dyeing method.

The dyeings and prints obtained with the reactive dyes employed in the process of this invention are distinguished by clear shades. High degrees of fixation are obtained and the dyeings and prints have excellent colour strength, good lightfastness and very good wetfastness properties.

It is to be singled out for special mention that the process of this invention is non-tendering.

The invention is illustrated by the following Examples in which percentages are by weight, unless otherwise indicated.

EXAMPLE 1

The dyeing vessel of a laboratory dyeing apparatus is charged with 1 l of water of 30° C. Then 25 g of tussah fabric are put into the water and agitated continuously. After 5 minutes, 0.5 g of the reactive dye of the formula

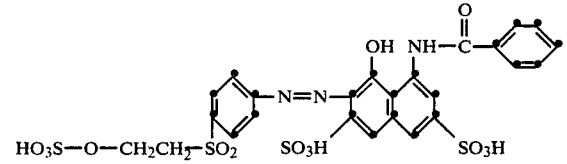

predissolved in 20 ml of hot water, are slowly added. After 10 minutes at 30° C., 20 g of Na$_2$SO$_4$ or NaCl are added and the bath is then heated to 85° C. at a rate of 1° C. per minute. When the bath temperature has reached 45° C., 20 g of Na$_2$SO$_4$ or NaCl are again added and once more at 60° C. The bulk of the dye is exhausted 20 minutes after the dyeing temperature of 85° C. has been reached. Depending on the pretreatment of the raw goods, the pH of the dyebath is 4.5 to 6.5. Then about 2 g of anhydrous sodium carbonate are added to bring to the pH to 8.5 to 9.7. Dyeing is carried out for another 20 minutes at 85° C. and the bath is then cooled and the goods are rinsed thoroughly.

A fresh bath is prepared from 1 l of water of 70° C. and 1 g of a non-ionic detergent obtained by addition of 10 equivalents of ethylene oxide to isononylphenol. The dyed goods are agitated for 15 minutes at 70° C. in the wash liquor and then cooled and rinsed. The goods are then acidified for 10 minutes in a bath of 40° C. consisting of 1 l of water and 1 ml of 85% formic acid, and subsequently squeezed out and dried in conventional manner. A brilliant red dyeing with good wetfastness properties is obtained.

Similar dyeings with very good wetfastness properties are obtained with the following dyes:

| Amount | Reactive dye of the formula | Shade | Depth of Shade |
|---|---|---|---|
| 0.5 g | 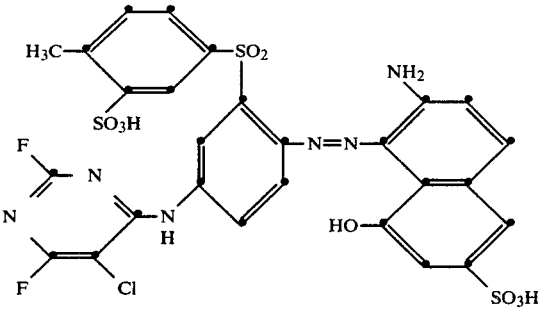 | bluish red | medium |
| 0.2 g | 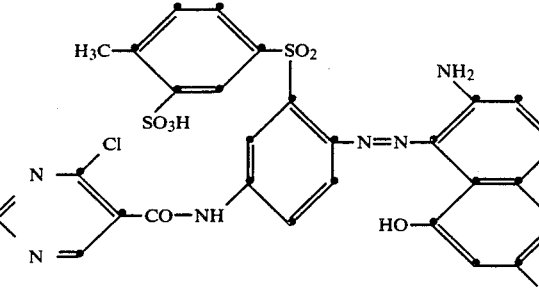 | bluish red | bright |
| 0.025 g | 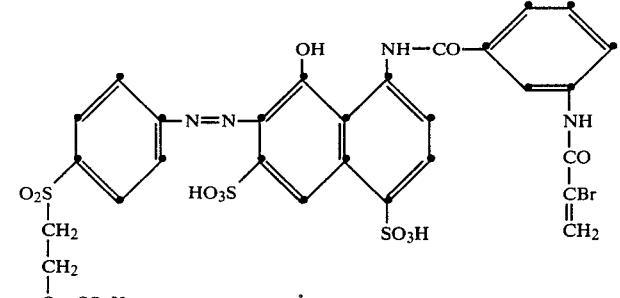 | red | pastel |

EXAMPLE 2

The dyeing vessel of a laboratory dyeing apparatus is charged with 1 l of water of 30° C. Then 25 g of silk yarn (Bombyx mori) are put into the water and agitated continuously. After 5 minutes, 0.5 g of the reactive dye of the formula

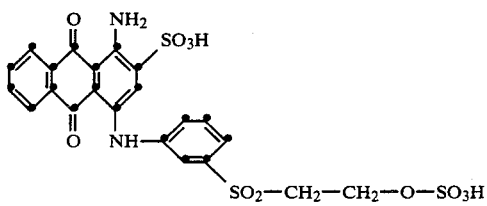

predissolved in 20 ml of hot water, are slowly added. After 10 minutes at 30° C., 20 g of $Na_2SO_4$ or NaCl are added and the bath is then heated to 70° C. at a rate of 1° C. per minute. When the bath temperature has reached 45° C., 20 g of $Na_2SO_4$ or NaCl are again added and once more at 60° C. The bulk of the dye is exhausted 15 minutes after the dyeing temperature of 70° C. has been reached. Depending on the pretreatment of the raw goods, the pH of the dyebath is 4.5 to 6.5. Then about 2 g of anhydrous sodium carbonate are added to bring to the pH to 8.5. Dyeing is carried out for another 20 minutes at 70° C. and the bath is then cooled and the goods are rinsed thoroughly.

A fresh bath is prepared from 1 l of water of 70° C. and 1 g of a non-ionic detergent obtained by addition of 10 equivalents of ethylene oxide to isononylphenol. The dyed goods are agitated for 15 minutes at 70° C. in the wash liquor and then cooled and rinsed. The goods are then acidified for 10 minutes in a bath of 40° C. consisting of 1 l of water and 1 ml of 85% formic acid, and subsequently squeezed out and dried in conventional manner. A brilliant blue dyeing with very good wetfastness properties is obtained.

Similar dyeings with very good wetfastness properties are obtained with the following dyes:

| Amount | Reactive dye of the formula | Shade | Depth of Shade |
|---|---|---|---|
| 0.25 g | (anthraquinone dye structure with SO₃H, CH₃, NH, CH₂—NH—C=N, F, Cl, F groups) | reddish blue | bright |
| 0.025 g | (anthraquinone dye structure with SO₃H, CH₃, NH, CH₂—NH—CO—, Cl, N groups) | reddish blue | pastel |
| 0.25 g | (complex dye structure with multiple SO₃H, Cl, NH—CH₂, CH₂—NH groups) | | |

EXAMPLE 3

A winch beck is filled with 1000 liters of water of 30° C. and then charged with 5 pieces of wool/tussah fabric, each of 5 kg, i.e. with altogether 25 kg. The fabric is thoroughly wetted for 10 minutes. Then 500 g of the reactive dye of the formula

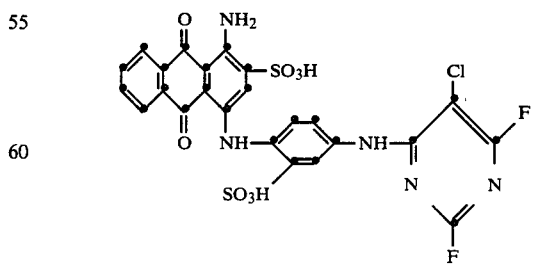

dissolved in 10 liters of hot water, are added to the dyebath and uniformly dispersed therein. After 10 minutes at 30° C. and a rate of circulation of 50 m/min, 30 kg of Glauber's salt or NaCl in solid form are added. The bath is then heated to 80° C. at a rate of 1° C. per minute at a constant rate of circulation of 50 m/min. 30 kg of Glauber's salt or NaCl are added at 45° C. and again at 60° C. Then about 2 kg of potash are added 20 minutes after the dyeing temperature of 80° C. has been reached, whereupon the pH rises to 10. The goods are kept for another 20 minutes at 80° C. and a rate of circulation of 50 m/min. The bath is cooled to 40° C. by adding cold water and discharged. The goods are rinsed with 1000 liters of cold or warm water and the rinsing liquor is discharged after 5 to 10 minutes. The dyeing vessel is then charged with 1000 liters of cold (or warm) water and 1 kg of a detergent or wetting agent (obtained by addition of 10 equivalents of ethylene oxide to isononyl phenol) is added and the bath is heated to 60° C. After 15 minutes at a rate of circulation of 50 m/min—during which time the pH must be at least 8.5 by adding, if necessary, sodium carbonate—the bath is cooled to 40° C. with cold water and discharged. The goods are rinsed with 1000 liters of cold water until the washings run clear and the rinsing procedure is repeated once or more than once. 1 liter of 85% formic acid is added to the last rinsing bath and the bath is warmed to 40° C. and kept at this temperature for 10 minutes. The liquor is then discharged and the dyed goods are squeezed out and dried in the conventional manner. A brilliant blue dyeing with good wet-fastness properties is obtained.

Similar dyeings with very good wetfastness properties are obtained with the following dyes:

| Amount | Reactive dye of the formula | Shade | Depth of Shade |
|---|---|---|---|
| 250 g | (structure) | blue | bright |
| 25 g | (structure) | blue | pastel |
| 100 g | mixture of<br>CuPc—SO$_2$NHCH$_2$CH$_2$—NH—CO—CBr=CH$_2$, (SO$_3$H)$_2$, SO$_2$NH—C$_6$H$_4$—SO$_2$CH$_2$CH$_2$OSO$_3$H<br>[CuPc = copper phthalocyanine radical]<br>and | | |

-continued
| Amount | Reactive dye of the formula | Shade | Depth of Shade |
|---|---|---|---|
| 375 g | 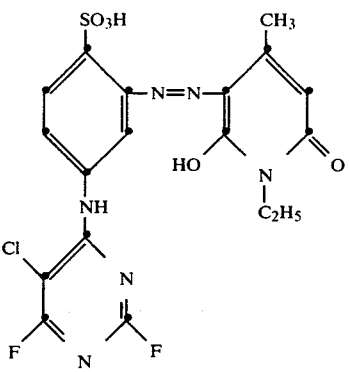 | yellowish green | medium |
| | mixture of | | |
| 100 g | 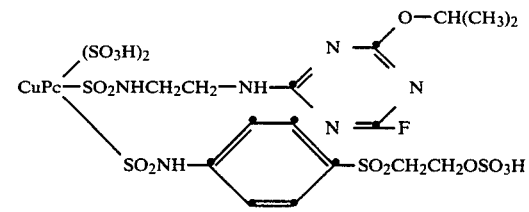  [CuPc = copper phthalocyanine radical]  and | | |
| 375 g | 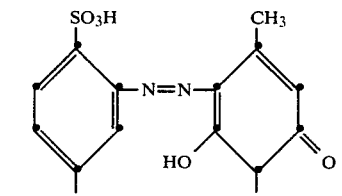 | yellowish green | medium |
| | mixture of | | |
| 250 g | 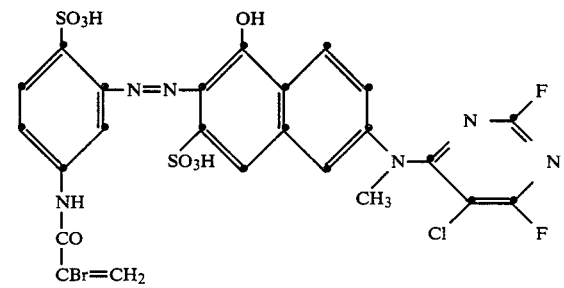 | | |

-continued
| Amount | Reactive dye of the formula | Shade | Depth of Shade |
|---|---|---|---|
| 75 g | 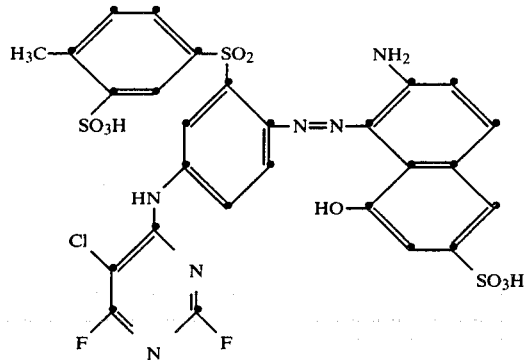 | | |
| | and | | |
| 37.5 g | 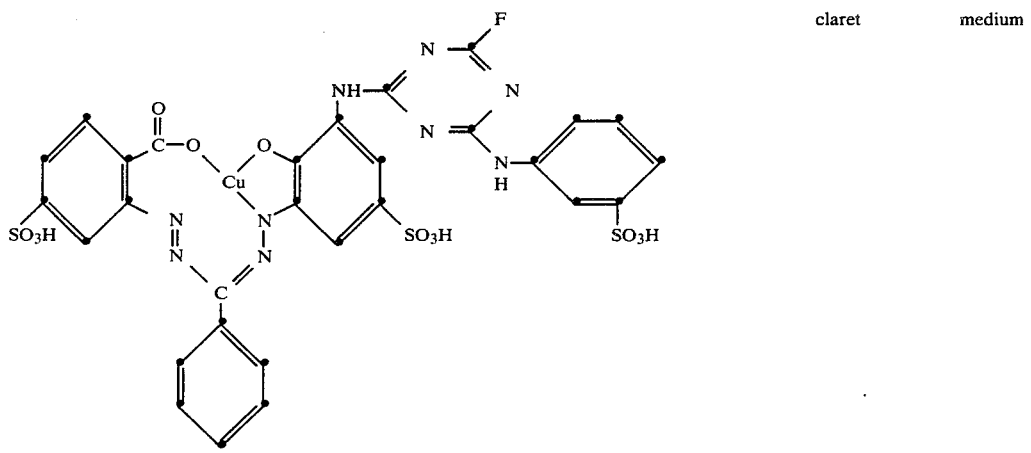 | claret | medium |
| | mixture of | | |
| 250 g | 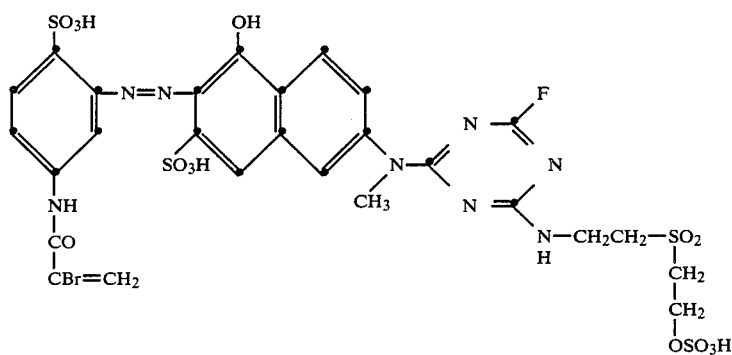 | | |

| Amount | Reactive dye of the formula | Shade | Depth of Shade |
|---|---|---|---|

75 g

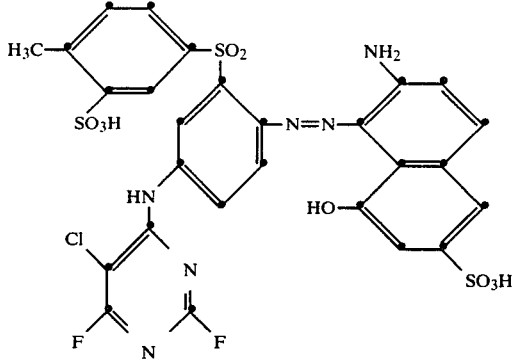

and 37.5 g                                                                        claret      medium

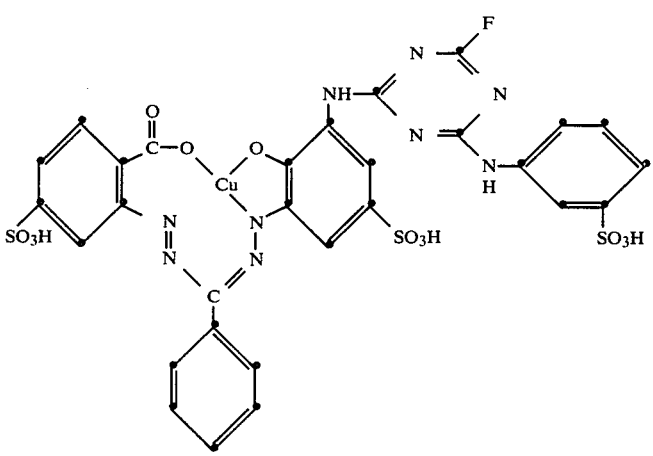

EXAMPLE 4

A winch beck is filled with 1000 liters of water of 30° C. and then charged with 5 pieces of a wool/tussah blend (50/50), each of 5 kg, i.e. with altogether 25 kg. The fabric is thoroughly wetted for 10 minutes. Then 500 g of the reactive dye of the formula

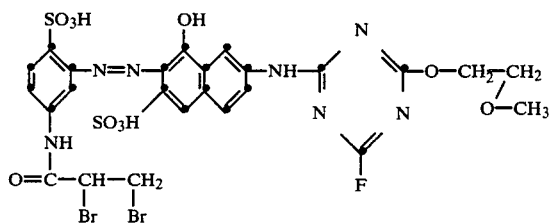

dissolved in 10 liters of hot water, are added to the dyebath and uniformly dispersed therein. After 10 minutes at 30° C. and a rate of circulation of 50 m/min, 30 kg of Glauber's salt or NaCl in solid form are added. The bath is then heated to 60° C. at a rate of 1° C. per minute at a constant circulation speed of 50 m/min. 30 kg of Glauber's salt or NaCl are added at 45° C. and again at 60° C. Then about 2 kg of anhydrous sodium carbonate are added 20 minutes after the dyeing temperature of 60° C. has been reached, whereupon the pH rises to 8.5-9.5. The goods are kept for another 20 minutes at 60° C. and a rate of circulation of 50 m/min. The bath is cooled to 40° C. by adding cold water and discharged. The goods are rinsed with 1000 liters of cold or warm water and the rinsing liquor is discharged after 5 to 10 minutes. The dyeing vessel is then charged with 1000 liters of cold (or warm) water and 1 kg of a detergent or wetting agent (obtained by addition of 10 equivalents of ethylene oxide to isononyl phenol) is added and the bath is heated to 60° C. After 15 minutes at a rate of circulation of 50 m/min—during which time the pH must be at least 8.5 by adding, if necessary, sodium carbonate—the bath is cooled to 40° C. with cold water and discharged. The goods are rinsed with 1000 liters of cold water until the washings run clear and the rinsing procedure is repeated once or more than once. 1 liter of 85% formic acid is added to the last rinsing bath and the bath is warmed to 40° C. and kept at this temperature for 10 minutes. The liquor is then discharged and the dyed goods are squeezed out and dried in the conventional manner. A brilliant red dyeing with good wetfastness properties is obtained.

Similar dyeings with very good wetfastness properties are obtained with the following dyes:

| Amount | Reactive dye of the formula | Shade | Depth of Shade |
|---|---|---|---|
| 375 g | Mixture of 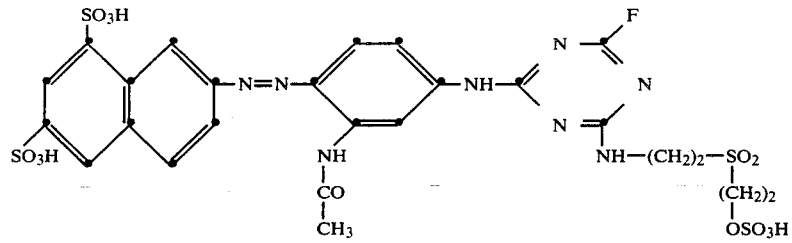 | | |
| 125 g | and 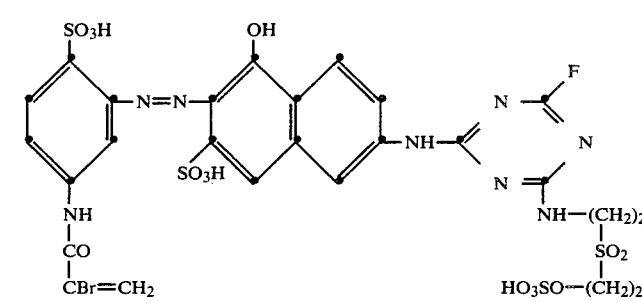 | brillant golden yellow | medium |
| 125 g | Mixture of 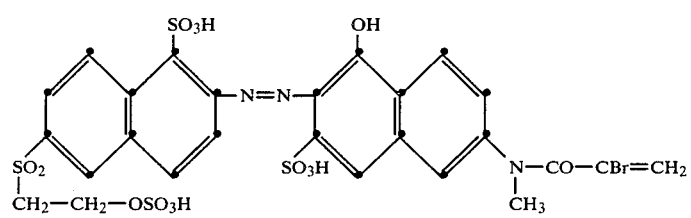 | | |
| 250 g | and 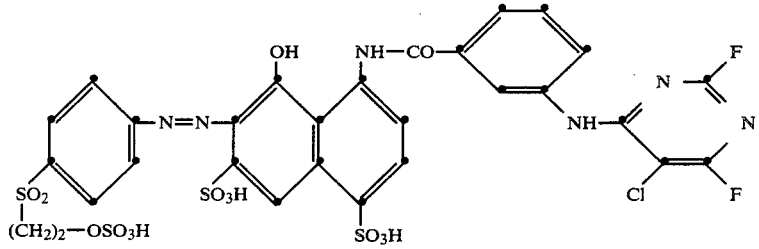 | brillant red | medium |
| 50 g | mixture of 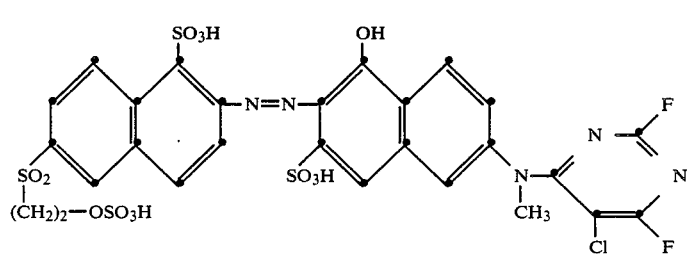 and | | |

| Amount | Reactive dye of the formula | Shade | Depth of Shade |
|---|---|---|---|
| 100 g | 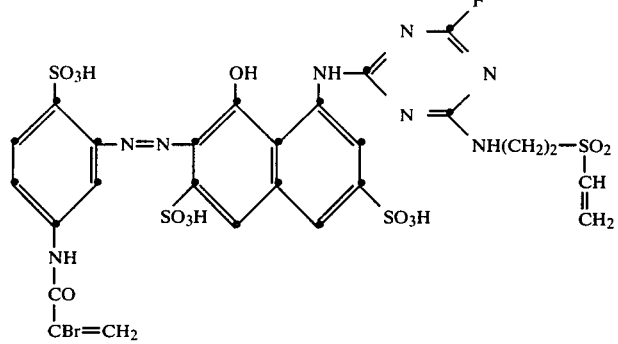 | red | bright |
| | mixture of | | |
| 12.5 g | 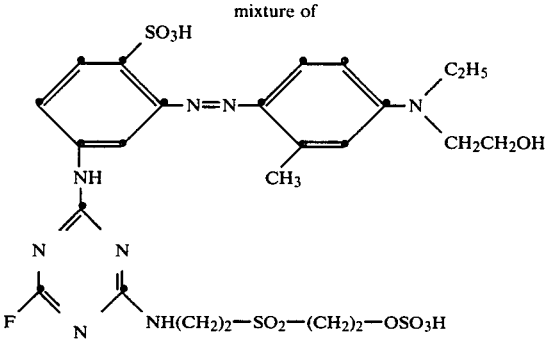 | | |
| | and | | |
| 25 g | 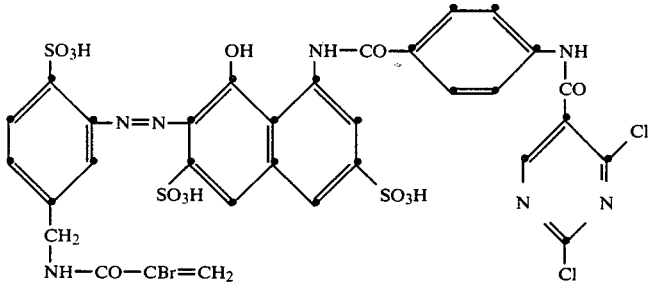 | pink | pastel |
| 25 g | 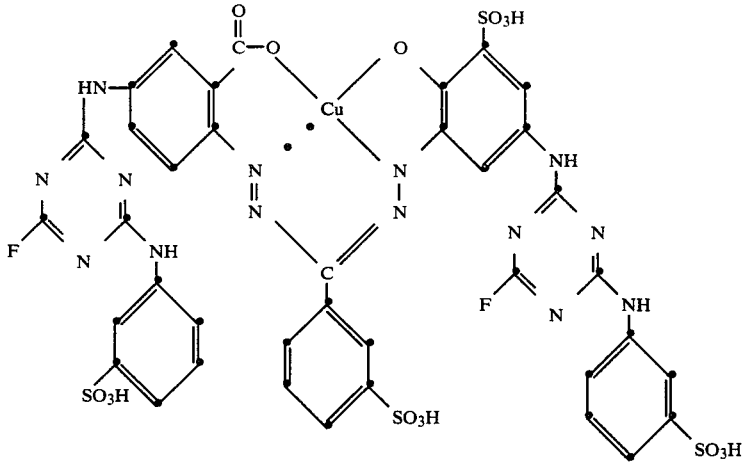 | blue | bright |
EXAMPLE 5
A winch beck is filled with 1000 liters of water of 30° C. and then charged with 5 pieces of tussah silk fabric, each of 5 kg, i.e. with altogether 25 kg. The fabric is thoroughly wetted for 10 minutes. Then 1500 g of the reactive dye of the formula

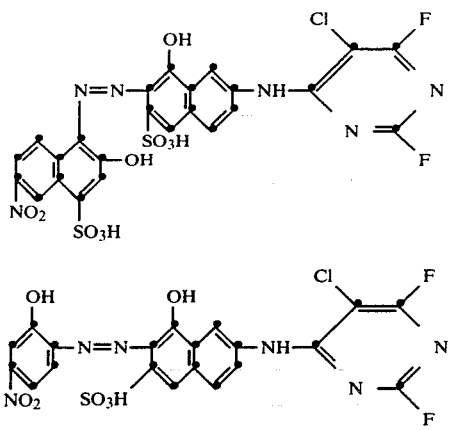

1:2 cobalt mixed complex dissolved in 20 liters of hot water, are added to the dyebath and uniformly dispersed therein. After 10 minutes at 30° C. and a rate of circulation of 50 m/min, 40 kg of Glauber's salt or NaCl in solid form are added. The bath is then heated to 95° C. at a rate of 1° C. per minute at a constant circulation speed of 50 m/min. 40 kg of Glauber's salt or NaCl are added at 45° C. and again at 60° C. Then about 2 kg of anhydrous potassium carbonate are added 20 minutes after the dyeing temperature of 95° C. has been reached, whereupon the pH rises to 10. The goods are kept for another 25 minutes at 95° C. and a rate of circulation of 50 m/min. The bath is cooled to 40° C. by adding cold water and discharged. The goods are rinsed with 1000 liters of cold or warm water and the rinsing liquor is discharged after 5 to 10 minutes. The dyeing vessel is then charged with 1000 liters of cold (or warm) water and 1 kg of a detergent or wetting agent (obtained by addition of 10 equivalents of ethylene oxide to isononyl phenol) is added and the bath is heated to 70° C. After 15 minutes at a rate of circulation of 50 m/min—during which time the pH must be at least 8.5 by adding, if necessary, sodium carbonate—the bath is cooled to 40° C. with cold water and discharged. The goods are rinsed with 1000 liters of cold water until the washings run clear and the rinsing procedure is repeated once or more than once. 1 liter of 85% formic acid is added to the last rinsing bath and the bath is warmed to 40° C. and kept at this temperature for 10 minutes. The liquor is then discharged and the dyed goods are squeezed out and dried in the conventional manner. A deep black dyeing with good wetfastness properties is obtained.

Similar dyeings with very good wetfastness properties are obtained with the following dyes:

| Amount | Reactive dye of the formula | Shade | Depth of Shade |
|---|---|---|---|
| 1000 g | | blue black | deep |
| 1500 g | | blue black | deep |
| 500 g | | bluish grey | medium |

-continued

| Amount | Reactive dye of the formula | Shade | Depth of Shade |
|---|---|---|---|
| 250 g | CuPc$-$SO$_2$NH$-$CH$_2$CH$_2$$-$NH$-$[triazine with F, N, OCH$_3$], with (SO$_3$H)$_2$ and SO$_2$$-$NH$-$C$_6$H$_4$$-$SO$_2$$-$(CH$_2$)$_2$$-$OSO$_3$H substituents [CuPc = copper phthalocyanine radical] | turquoise | bright | mixture of

| 500 g | CuPc$-$SO$_2$NHCH$_2$CH$_2$$-$NH$-$CO$-$CBr=CH$_2$, with (SO$_3$H)$_2$ and SO$_2$NH$-$C$_6$H$_4$$-$SO$_2$CH$_2$CH$_2$OSO$_3$H substituents [CuPc = copper phthalocyanine] | | | and

| 50 g | [Azo dye: SO$_3$H-phenyl$-$N=N$-$pyridone(CH$_3$, HO, N$-$C$_2$H$_5$, O) with NH$-$C=O$-$CH=C(Cl)$-$N=C(Cl)$-$N$=$ substituent] | bluish green | medium | mixture of

| 1000 g | [Naphthyl azo dye: SO$_3$H-phenyl$-$N=N$-$naphthalene(OH, SO$_3$H, SO$_3$H)$-$NH$-$CO$-$C$_6$H$_4$$-$NH$-$pyrimidine(Cl, F, F); with CH$_2$$-$NH$-$CO$-$CBr=CH$_2$ substituent] | | | and

| Amount | Reactive dye of the formula | Shade | Depth of Shade |
|---|---|---|---|
| 500 g | (structure: sulfonated phenyl-N=N-phenyl with N(C2H5)(CH2CH2OH), CH3, and NH-C(Cl)=C-C(F)=N-C(F)=N pyrimidine substituent) | red | deep |
| | mixture of | | |
| 500 g | (H-acid based azo structure with SO3H, OH, NH to difluoropyrimidine, NH—(CH2)2—SO2—CH=CH2 vinylsulfone group) | red | deep |
| | and | | |
| 500 g | (naphthol azo structure with SO3H, OH, NH—CO—CBr=CH2, and NH-difluorochloropyrimidine) | red | deep |

EXAMPLE 6

A winch beck is filled with 1000 liters of water of 30° C. and then charged with 5 pieces of silk fabric (Bombyx mori) each of 5 kg, i.e. with altogether 25 kg. The fabric is thoroughly wetted for 10 minutes. Then 500 g of the reactive dye of the formula

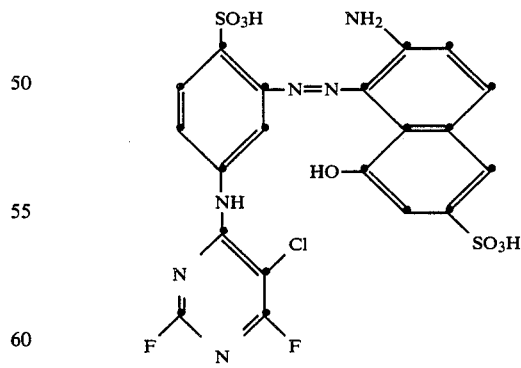

dissolved in 10 liters of hot water, are added to the dyebath and uniformly dispersed therein. After 10 minutes at 30° C. and a rate of circulation of 50 m/min, 20 kg of Glauber's salt or NaCl in solid form are added. The bath is then heated to 70° C. at a rate of 1° C. per minute at a constant circulation speed of 50 m/min. 20 kg of Glauber's salt or NaCl are added at 45° C. and again at 60° C. Then about 2 kg of anhydrous sodium carbonate are added 20 minutes after the dyeing temperature of 70° C. has been reached, whereupon the pH rises to 8.5–9.5. The goods are kept for another 20 minutes at 70° C. and a rate of circulation of 50 m/min. The bath is cooled to 40° C. by adding cold water and discharged. The goods are rinsed with 1000 liters of cold or warm water and the rinsing liquor is discharged after 5 to 10 minutes. The dyeing vessel is then charged with 1000 liters of cold (or warm) water and 1 kg of a detergent or wetting agent (obtained by addition of 10 equivalents of ethylene oxide to isononyl phenol) is added and the bath is heated to 70° C. t a rate of circulation of 50 m/min—during which time the pH must be at least 8.5 by adding, if necessary, sodium carbonate—the bath is cooled to 40° C. with cold water and discharged. The goods are rinsed with 1000 liters of cold water until the washings run clear, the rinsing procedure being repeated once or more than once. 1 liter of 85% formic acid is added to the last rinsing bath and the bath is warmed to 40° C. and kept at this temperature for 10 minutes. The liquor is then discharged and the dyed goods are squeezed out and dried in the conventional manner. A brilliant red dyeing with very good wetfastness properties is obtained.

Similar dyeings with very good wetfastness properties are obtained with the following dyes:

| Amount | Reactive dye of the formula | Shade | Depth of Shade |
|---|---|---|---|
| | mixture of | | |
| 500 g | 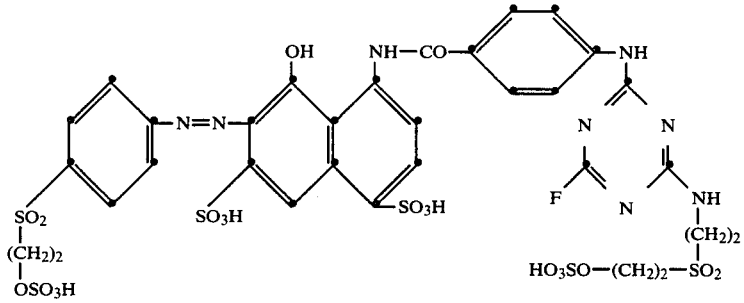 | | |
| | and | | |
| 250 g | 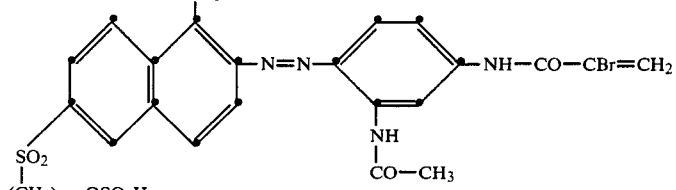 | yellowish red | deep |
| | mixture of | | |
| 250 g | 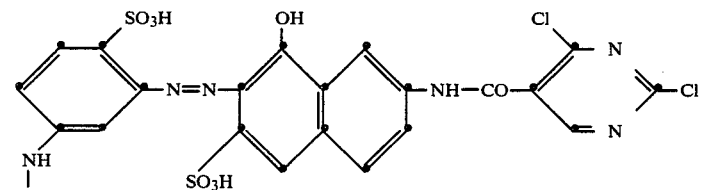 | | |
| | and | | |
| 50 g | 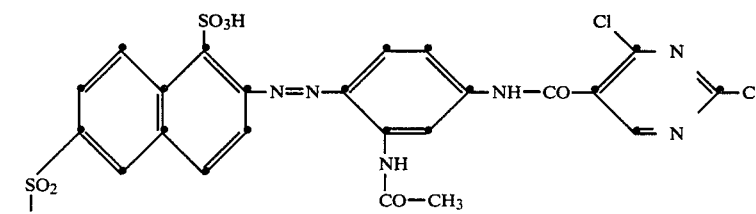 | yellowish red | medium |
| | mixture of | | |

| Amount | Reactive dye of the formula | Shade | Depth of Shade |
|---|---|---|---|
| 250 g | [structure] | | |
| | and | | |
| 50 g | [structure] | red | bright |
| | mixture of | | |
| 500 g | [structure] | | |
| | and | | |
| 100 g | [structure] | red | medium |

EXAMPLE 7

The dyeing vessel of a laboratory dyeing apparatus is charged with 1 l of water of 30° C. Then 25 g of silk fabric (Bombyx mori) are put into the water and agitated continuously. After 5 minutes, 0.25 g of the reactive dye of the formula

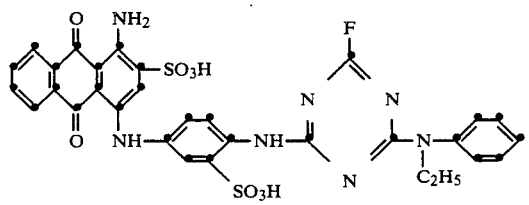

predissolved in 20 ml of hot water, are slowly added. After 10 minutes at 30° C., 10 g of Na₂SO₄ or NaCl are added and the bath is then heated to 55° C. at a rate of 1° C. per minute. When the bath temperature has reached 40° C., 10 g of Na₂SO₄ or NaCl are again added and once more at 50° C. The bulk of the dye is exhausted 10 minutes after the dyeing temperature of 55° C. has been reached. Depending on the pretreatment of the raw goods, the pH of the dyebath is 4.5 to 6.5. Then about 2 g of anhydrous sodium carbonate are added to bring to the pH to 8.5 to 9.7. Dyeing is carried out for another 20 minutes at 55° C. and the bath is then cooled and the goods are rinsed thoroughly.

A fresh bath is prepared from 1 l of water of 60° C. and 1 g of a non-ionic detergent obtained by addition of 10 equivalents of ethylene oxide to isononylphenol. The dyed goods are agitated for 15 minutes at 60° C. in the wash liquor and then cooled and rinsed. The goods are then acidified for 10 minutes in a bath of 40° C. consisting of 1 l of water and 1 ml of 85% formic acid, and subsequently squeezed out and dried. A greenish blue dyeing with good wetfastness properties is obtained.

Similar dyeings with very good wetfastness properties are obtained with the following dyes:

| Amount | Reactive dye of the formula | Shade | Depth of Shade |
|---|---|---|---|
| 0.025 g | Mixture of 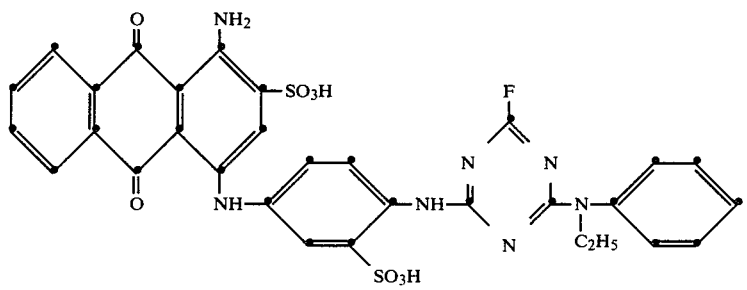 | | |
| and | | | |
| 0.0125 g | 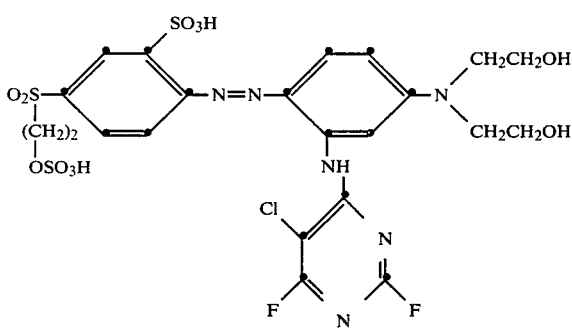 | beige | bright |
| 0.025 g | mixture of 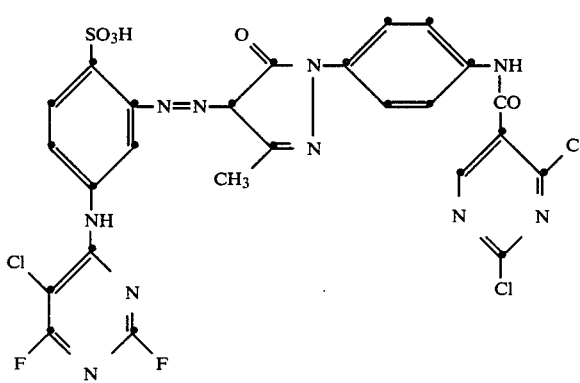 | | |

| Amount | Reactive dye of the formula | Shade | Depth of Shade |
|---|---|---|---|
| 0.0125 g and 0.0063 g | [structure: sulfonated tolyl-SO2-phenyl(NH-chloro-difluoropyrimidinyl)-N=N-amino-hydroxy-naphthalene-sulfonic acid] mixture of [anthraquinone: 1-amino-2-sulfo-4-(NH-phenyl-sulfo-NH-fluoropyrimidinyl-N(C2H5)-phenyl)] | beige | bright |
| 0.375 g and 0.063 g | [structure: sulfo-phenyl-NHCO-CBr=CH2, N=N-pyrazolone-CH3, N-phenyl-NHCO-chloro-difluoropyrimidinyl] [anthraquinone: 1-amino-2-sulfo-4-(NH-phenyl-sulfo-NH-fluoropyrimidinyl-N(C2H5)-phenyl)] | green | medium |

EXAMPLE 8

The dyeing vessel of a laboratory dyeing apparatus is charged with 1 l of water of 30° C. Then 25 g of silk fabric (Bombyx mori) are put into the water and agitated continuously. After 5 minutes, 1.25 g of the reactive dye of the formula

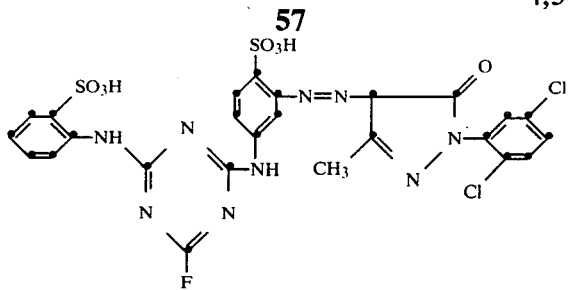

predissolved in 20 ml of hot water, are slowly added. After 10 minutes at 30° C., 30 g of Na₂SO₄ or NaCl are added and the bath is then heated to 60° C. at a rate of 1° C. per minute. When the bath temperature has reached 45° C., 30 g of Na₂SO₄ or NaCl are again added and once more at 60° C. The bulk of the dye is exhausted 20 minutes after the dyeing temperature of 60° C. has been reached. Depending on the pretreatment of the raw goods, the pH of the dyebath is 4.5 to 6.5. Then about 2 g of anhydrous sodium carbonate are added to bring the pH to 8.5 to 9.7. Dyeing is carried out for another 20 minutes at 60° C. and the bath is then cooled and the goods are rinsed thoroughly.

A fresh bath is prepared from 1 l of water of 60° C. and 1 g of a non-ionic detergent obtained by addition of 10 equivalents of ethylene oxide to isononylphenol. The dyed goods are agitated for 15 minutes at 60° C. in the wash liquor and then cooled and rinsed. The goods are then acidified for 10 minutes in a bath of 40° C. consisting of 1 l of water and 1 ml of 85% formic acid, and subsequently squeezed out and dried. A brilliant yellow dyeing with good wetfastness properties is obtained.

Similar dyeings with very good wetfastness properties are obtained with the following dyes:

| Amount | Reactive of the formula | Shade | Depth of Shade |
|---|---|---|---|
| 1.25 g | (structure with SO₃H, N=N, CH₃, Cl, NH, CO, N, Cl, SO₂(CH₂)₂—OSO₃H) | yellow | medium |
| 1.25 g | (structure with SO₃H, N=N, CH₃, NH, CO, CBr=CH₂, SO₂(CH₂)₂OSO₃H) | yellow | medium |
| 1.25 g | (structure with SO₃H, N=N, CH₃, NH, Cl, N, F, F, SO₂(CH₂)₂OSO₃H) | yellow | medium |

EXAMPLE 9

A winch beck is filled with 1000 liters of water of 30° C. and then charged with 5 pieces of tussah silk fabric, each of 5 kg, i.e. with altogether 25 kg. The fabric is thoroughly wetted for 10 minutes. Then 1250 g of the reactive dye of the formula

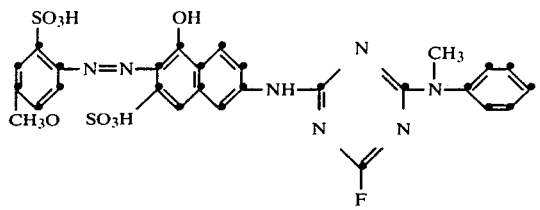

dissolved in 20 liters of hot water, are added to the

| Amount | Reactive dye of the formula | Shade | Depth of Shade |
|---|---|---|---|
| 1250 g | mixture of | | |
| and 250 g | | yellow red | deep | dyebath and uniformly dispersed therein. After 10 minutes at 30° C. and a rate of circulation of 50 m/min, 40 kg of Glauber's salt or NaCl in solid form are added. The bath is then heated to 85° C. at a rate of 1° C. per minute at a constant rate of circulation of 50 m/min. 40 kg of Glauber's salt or NaCl are added at 45° C. and again at 60° C. Then about 2 kg of anhydrous sodium carbonate are added 20 minutes after the dyeing temperature of 85° C. has been reached, whereupon the pH rises to 8.5–9.5 The goods are kept for another 25 minutes at 85° C. and a rate of circulation of 50 m/min. The bath is cooled to 40° C. by adding cold water and discharged. The goods are rinsed with 1000 liters of cold or warm water and the rinsing liquor is discharged after 5 to 10 minutes. The dyeing vessel is then charged with 1000 liters of cold (or warm) water and 1 kg of a detergent or wetting agent (obtained by addition of 10 equivalents of ethylene oxide to isononyl phenol) is added and the bath is heated to 70° C. After 15 minutes at a rate of circulation of 50 m/min—during which time the pH must be at least 8.5 by adding, if necessary, sodium carbonate—the bath is cooled to 40° C. with cold water and discharged. The goods are rinsed with 1000 liters of cold water until the washings run clear and the rinsing procedure is repeated once or more than once. 1 liter of 85% formic acid is added to the last rinsing bath and the bath is warmed to 40° C. and kept at this temperature for 10 minutes. The liquor is then discharged and the dyed goods are squeezed out and dried in the conventional manner. A brilliant scarlet dyeing with good wetfastness properties is obtained.

Similar dyeings with good wetfastness properties are obtained with the following dyes:

EXAMPLE 10

The dyeing vessel of a laboratory circulating dyeing machine is filled with 300 ml of water of 50° C. Then 20 g of a polyester/silk blend (50/50) are put into the dyeing vessel and the liquid is continuously agitated. After 5 minutes, 0.1 g of a non-ionic wetting agent and 0.3 g of sodium acetate are added and the liquor is adjusted to pH 5 with about 0.3 ml of 85% acetic acid. Then 0.1 g of the dye of the formula

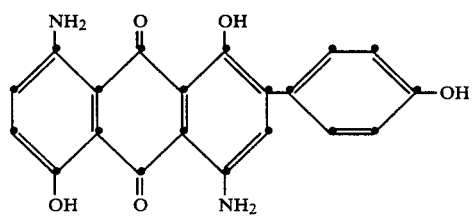

0.1 g of the dye of the formula

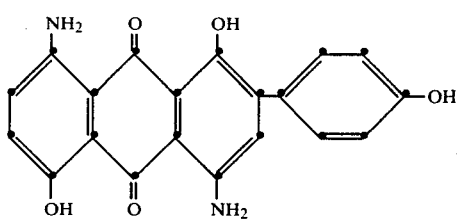

0.01 g of the dye of the formula

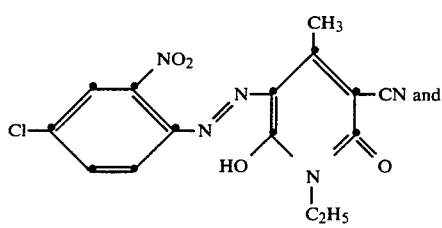

0.2 g of the dye of the formula

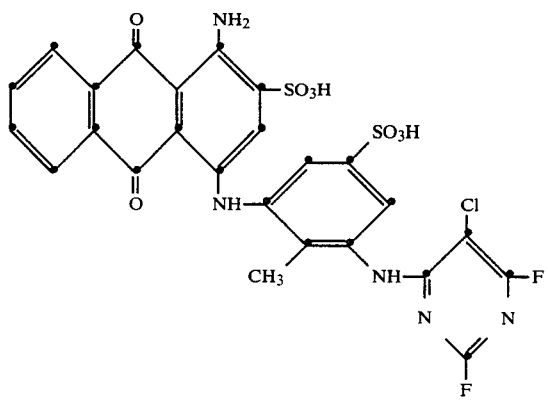

predissolved in 20 ml of hot water, are added. After 5 minutes the bath is heated to 120° C. at a rate of 2° C. per minute and kept for 30 minutes at this temperature. The bath is then cooled to 80° C. and 6 g of Na$_2$SO$_4$ are added. After 10 minutes 6 g of Na$_2$SO$_4$ are again added and the same amount is added once more after another 10 minutes. Dyeing is carried out for altogether 30 minutes at 80° C. The pH of the dyebath is 4.5–6. Then 0.8 g of anhydrous sodium carbonate is added and the pH rises to 9–9.5. Fixation is carried out for 20 minutes at 80° C., the dyebath is then cooled and the dyed goods are rinsed for 5 minutes at 70° C.

A fresh bath is prepared from 300 ml of water of 80° C. and 0.5 g of a non-ionic detergent obtained by addition of 10 equivalents of ethylene oxide to isononyl phenol. The goods are treated for 15 minutes at 80° C. with the wash liquor, cooled, and rinsed for 5 minutes with water of 60° C. and for 5 minutes with water of 30° C. The dyed goods are then acidified in a bath consisting of 300 ml of water and 0.3 ml of 85% formic acid and then squeezed out and dried in the conventional manner. A brilliant blue dyeing is obtained, the polyester component of which is dyed in substantially the same shade and depth as the silk component.

EXAMPLE 11

The dyeing vessel of a laboratory dyeing apparatus is filled with 500 ml of water of 25° C., then 12.5 g of a cotton/silk blend are put in and continuously agitated in the liquor. After 5 minutes, 0.250 g of the dye of the formula

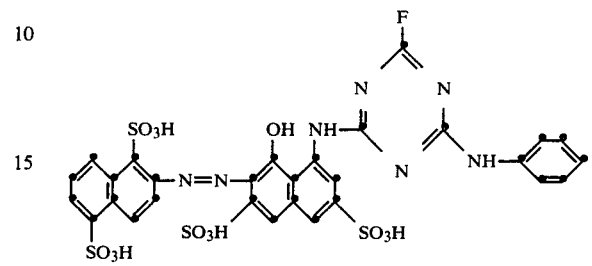

predissolved in 20 ml of hot water, are added. The bath is kept for 5 minutes at 25° C. and then 25 g of Na$_2$SO$_4$ are added and the bath is heated to 60° C. at a rate of 1° C. per minute. Then 1 g of anhydrous sodium carbonate is added and the pH rises to 9–9.5. Fixation is carried out for 30 minutes at 60° C., the dyebath is then cooled and the dyed goods are rinsed repeatedly with cold water. A fresh bath is prepared from 500 ml of water of 80° C. and 0.5 g of a non-ionic detergent obtained by addition of 10 equivalnts of ethylene oxide to isononyl phenol. The goods are treated for 15 minutes at 80° C. with the wash liquor, cooled, and rinsed thoroughly with cold water. The dyed goods are then acidified in a bath consisting of 500 ml of water and 0.5 ml of 85% formic acid and then squeezed out and dried in the conventional manner. A brilliant bluish red dyeing is obtained, the silk and cotton components of which are dyed in substantially the same shade and depth.

EXAMPLE 12: Printing on silk fabric

Preparation of the printing paste:
30 g of the dye of the formula

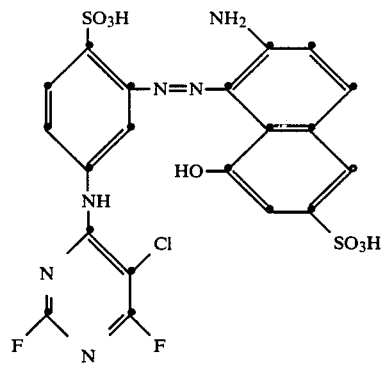

are homogeneously mixed with 50 g of urea, 20 g of thiodiethylene glycol and 100 ml of cold water. With stirring, 300 ml of boiling water are added. Then 400 g of a 10% sodium alginate solution and 20 g of Na$_2$CO$_3$ are stirred in and the mixture is made up to 1000 g with water.

The readily flowable printing paste is applied to silk fabric by means of a film printing, rotary printing or roller printing machine. The add-on of printing paste is about 50% on each covered area. The printing fabric is dried in a hot air drier and then steamed for 30 minutes at 0.2 bar overprssure in a star steamer. The fabric is first rinsed cold and then hot and subsequently treated for 15 minutes in a bath of 60° C. containing 2 g/l of a non-ionic detergent (obtained by addition of 10 equivalents of ethylene oxide to isononyl phenol) and 2 ml/l of 20% ammonia, and finally rinsed thoroughly with hot water. The fabric is then acidified for 10 minutes in a bath containing 1 ml/l of 80% acetic acid and subsequently squeezed out and dried in conventional manner. A brilliant bluish red print is obtained.

Similar prints are obtained with the following dyes:

| Amount | Reactive dye of the formula | Shade | Depth of Shade |
|---|---|---|---|
| 10 g | [structure with OH, NH—CO, N=N, SO₂(CH₂)₂OSO₃H, SO₃H, NH—CO—CBr=CH₂] | yellowish red | medium |
| | mixture of | | |
| 30 g | [structure with SO₃H, OH, NH, N=N, SO₃H, NH—CO—CBr=CH₂, pyrimidine with F, NH—(CH₂)₂—SO₂—CH=CH₂] | | |
| | and | | |
| 10 g | [anthraquinone structure with NH₂, SO₃H, O, O, NH—phenyl—SO₃H, NH—pyrimidine with Cl, F, F] | brown violet | medium |

EXAMPLE 13

The dyeing vessel of a laboratory dyeing apparatus is filled with 580 ml of water of 40° C., and then 20 g of silk yarn (Bombyx mori, degummed) and put in and the goods are allowed to circulate. After 5 minutes, 0.1 g of the dye of the formula

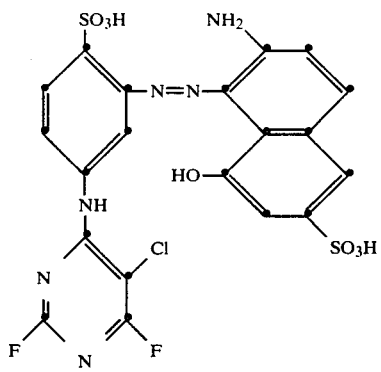

predissolved in 20 ml of hot water, is added. After 5 minutes at 40° C., 12 g of calcined Glauber's salt are added and the bath is heated to 120° C. at a rate of 2.5° C. per minute and kept for 10 minutes at this temperature. The bath is then cooled to 80° C. and 0.6 g/l of anhydrous sodium carbonate are added, whereupon the pH rises to 8.0–8.5. Fixation is carried out for 10 minutes at 80° C., then the bath is cooled and the goods are rinsed for 10 minutes at 40° C. The goods are then acidified for 10 minutes in a bath of 600 ml of water of 30° C. and 0.6 ml of 80% acetic acid, and then squeezed out and dried in conventional manner. A brilliant red dyeing is obtained.

A similar dyeing is obtained with the following dye mixture:

wherein D is a radical of a sulfo-group-containing dye of the monoazo, polyazo, metal complex azo, anthraquinone, phthalocyanine, formazane, azomethine, dioxazine, phenazine, stilbene, triphenylmethane, xanthene, thioxanthone, nitroaryl, naphthoquinone, pyrenequinone or perylentetracarbimide series;

n is 1 to 4; and

Y is chloroacetyl, bromoacetyl, β-chloropropionyl, β-bromopropionyl, β-sulfatoethylsulfonamino, α,β-dichloropropionyl, α,β-dibromopropionyl, acryloyl, α-chloroacryloyl, α-bromoacryloyl, 2-methanesulfonyl-6-methylpyrimid-4-yl, 2,5,6-trichloropyrimid-4-yl, 2,5,6-tribromopyrimid-4-yl, 2-methanesulfonyl-5-chloro-6-methylpyrimid-4-yl, 2,4-dichloropyrimid-6-carbonyl, 2,4-dichloropyrimid-5-carbonyl, 6-fluoro-5-chloropyrimid-4-yl, 2,4-difluoro-5-chloropyrimid-6-yl, 2,5-difluoropyrimid-4-yl, 4,6-difluoro-s-triazine-2-yl, or 6-fluoro-s-triazine-4-yl substituted in 2-position by an aryl or alkyl radical or by the radical of an aliphatic or aromatic compound which is bonded through the sulfur atom or through the oxygen atom, or is substituted in 2-position by —NH₂ or by the radical of an aliphatic, heterocyclic or aromatic amino compound which is bonded through the nitrogen atom; Y may be the same or different when n is greater than 1; provided that when n is 1, Y is not chloroacetyl, α-bromoacryloyl or α,β-dibromopropionyl, and when n is 2 both Y are not chloroacetyl, α-

| Amount | Reactive dye of the formula | Shade | Depth of Shade |
|---|---|---|---|
| 0.08 g | Mixture of 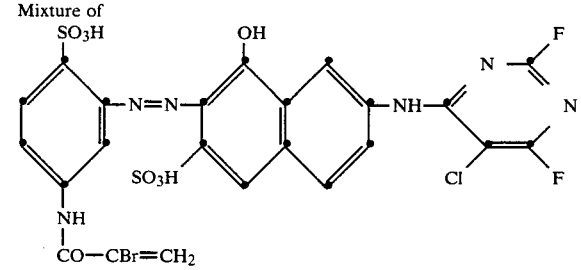 | | |
| and | | | |
| 0.02 g | 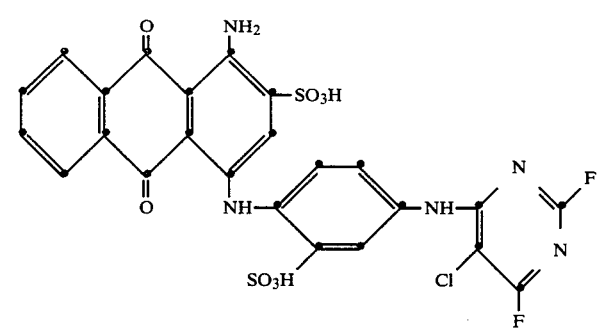 | brown | bright |

What is claimed is:

1. A process for dyeing or printing silk fibres with a reactive dye, comprising the step of applying to the fibres a reactive dye of the formula D–[Y]$_n$ bromoacryloyl, or α,β-dibromopropionyl; in aqueous medium at a temperature in the range of 50° to 130° C., and subsequently effecting dye fixation at pH 8 to 11.

2. The process of claim 1, wherein Y is α-bromoacryloyl, α,β-dibromopropionyl, 6-fluoro-5-chloropyrimid- 4-yl, 2,4-difluoro-5-chloropyrimid-6-yl, 2,5-difluoropyrimid-4-yl or one of the fluorotriazinyl radicals as defined in claim 1.

3. The process of claim 1, wherein Y is 2,4-difluoro-5-chloropyrimid-6-yl or 2-amino-6-fluoro-s-triazine 4-yl.

4. The process of claim 1, which comprises dyeing silk (Bombyx mori) with a 2-amino-6-fluoro-s-triazine-4-yl dye in the temperature range from 50° to 60° C., or with all said other reactive dyes in the temperature range from 60° to 80° C.

5. The process of claim 1, which comprises dyeing tussah silk with a 2-amino-6-fluoro-s-triazine-4-yl dye in the temperature range from 60° to 75° C., or with all said other reactive dyes in the temperature range from 70° to 100° C.

6. The process of claim 1, wherein D is the radical of a monoazo or disazo dye.

7. The process of claim 1, wherein D is the radical of a heavy metal azo dye complex.

8. The process of claim 1, wherein D is the radical of an anthraquinone dye.

9. The process of claim 1, wherein D is the radical of a copper or nickel phthalocyanine, of a copper formazan comlex or of a triphenyldioxazine.

10. The process of claim 1, wherein D is the radical of a 1:2 chromium or 1:2 cobalt complex azo dye of the benzene or naphthalene series, the chromium or cobalt atom being attached in each case to a metallizable group in the ortho-position to the azo bond.

11. The process of claim 1, wherein D is a radical of the formula $A_1$-N=N-K wherein $A_1$ is the radical of a diazo component of the benzene or naphthalene series and K is the radical of a coupling component of the benzene, naphthalene or heterocyclic series; and wherein Y is bonded to the diazo component $A_1$ and/or to the coupling component K directly or via a bridge member —N(R),— in which R is hydrogen or unsubstituted or substituted $C_1$-$C_4$-alkyl.

12. The process of claim 11, wherein R is hydrogen or methyl.

13. The process of claim 1, wherein dyeing is carried out at a temperature in the range of 60° to 90° C.

14. The process of claim 1, wherein dye fixation is carried out at pH 8.5 to 9.5.

15. The process of claim 1, wherein fixation alkali is added towards the end of the dyeing process.

16. The process of claim 1, wherein the dyed goods are given a washing off in an aqueous wash liquor at pH 8.5 to 9 and at elevated temperature.

17. The process of claim 16, wherein washing is carried out in the presence of a non-ionic detergent.

18. The process of claim 1 for dyeing or printing silk-containing fiber blends with dyestuff mixtures, one component of which is a reactive dye as defined in claim 1 and the other components are dyes which are not fiber-reactive.

19. The process of claim 1, whrein dyeing is carried out by the exhaust method.

* * * * *